(12) United States Patent
Tsuchiya et al.

(10) Patent No.: US 10,022,982 B2
(45) Date of Patent: Jul. 17, 2018

(54) RECORDING DEVICE, RECORDING METHOD, AND RECORDING UNIT

(71) Applicant: CANON KABUSHIKI KAISHA, Tokyo (JP)

(72) Inventors: Okinori Tsuchiya, Yokohama (JP); Akitoshi Yamada, Yokohama (JP); Junichi Nakagawa, Tokyo (JP); Tatsuhiro Yamagata, Inagi (JP); Yuto Kajiwara, Kawasaki (JP); Takeru Sasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/623,075

(22) Filed: Jun. 14, 2017

(65) Prior Publication Data
US 2017/0361622 A1   Dec. 21, 2017

(30) Foreign Application Priority Data
Jun. 16, 2016  (JP) .................................. 2016-120098

(51) Int. Cl.
| | |
|---|---|
| B41J 2/21 | (2006.01) |
| B41J 2/205 | (2006.01) |
| G06K 15/10 | (2006.01) |
| B41J 19/14 | (2006.01) |

(52) U.S. Cl.
CPC ............. B41J 2/2132 (2013.01); B41J 2/205 (2013.01); G06K 15/107 (2013.01); *B41J 2/2139* (2013.01); *B41J 19/147* (2013.01)

(58) Field of Classification Search
CPC ...... B41J 2/2132; B41J 2/2139; B41J 19/147; G06K 15/107
See application file for complete search history.

(56) References Cited

U.S. PATENT DOCUMENTS

2011/0285779 A1 * 11/2011 Yamada ................. B41J 2/2146
347/15

FOREIGN PATENT DOCUMENTS

JP            10-44519 A     2/1998

* cited by examiner

*Primary Examiner* — Sharon A Polk
(74) *Attorney, Agent, or Firm* — Canon U.S.A., Inc. IP Division

(57) ABSTRACT

A recording device includes a recording unit, a scanning unit, and a recording control unit. The recording unit includes first and second recording parts each having multiple discharge orifice rows that each have multiple discharge orifices arrayed in a predetermined direction. The first recording part and the second recording part are separated from each other in an intersecting direction that intersects the predetermined direction. The scanning unit performs recording scanning by moving the recording unit. The recording control unit performs recording of a region on the recording medium including one edge of the recording medium by the first recording part alone, recording of another region including the other edge of the recording medium by the second recording part alone, and recording of a region in between the two regions using both recording parts.

16 Claims, 13 Drawing Sheets

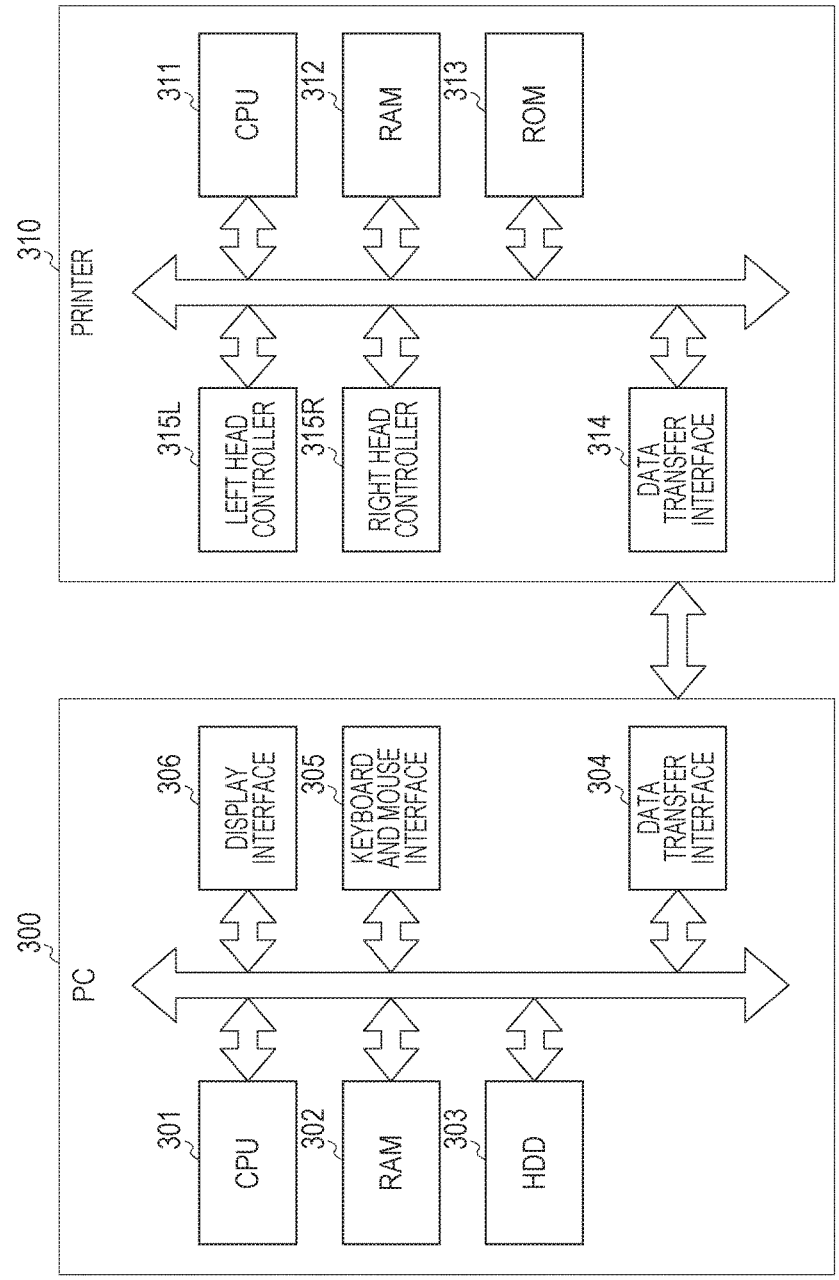

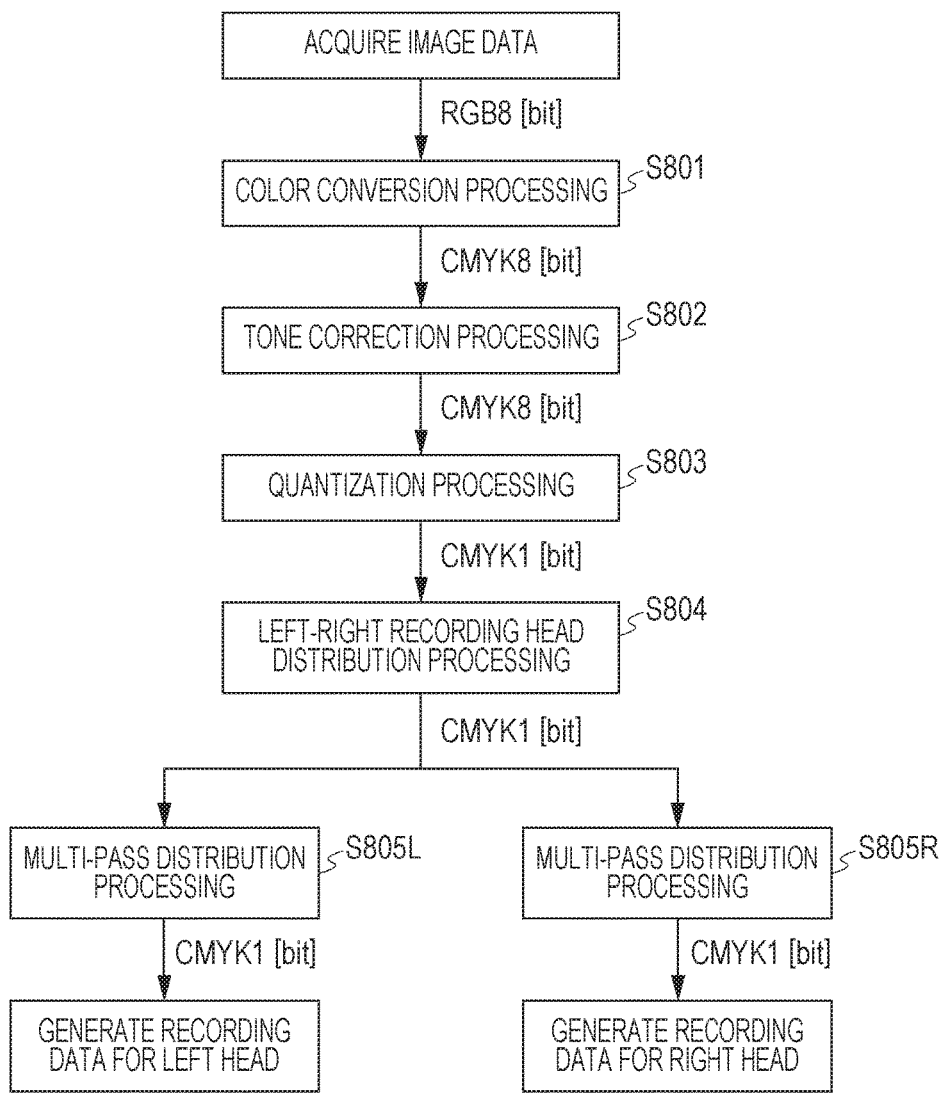

FIG. 4A
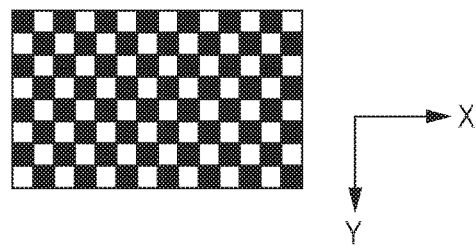
FIG. 4B
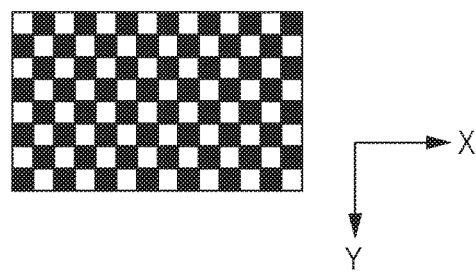
FIG. 5
| | LIGHTNESS L* | DIFFERENCE IN LIGHTNESS AS TO RECORDING MEDIUM ΔL* |
|---|---|---|
| SURFACE OF RECORDING MEDIUM | 95 | |
| K INK | 5 | 90 |
| C INK | 45 | 50 |
| M INK | 50 | 45 |
| Y INK | 90 | 5 |

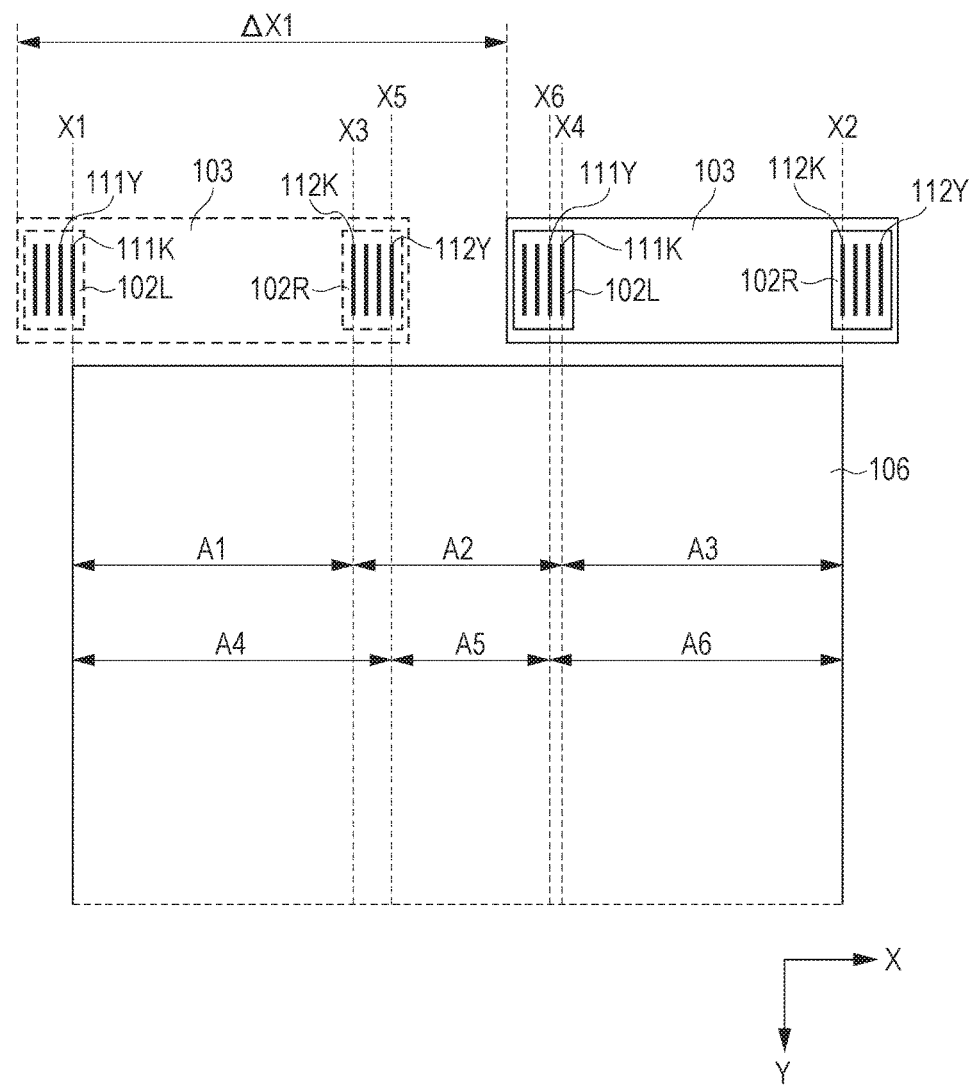

RECORDING DEVICE, RECORDING METHOD, AND RECORDING UNIT

BACKGROUND OF THE INVENTION

Field of the Invention

One disclosed aspect of the embodiments relates to a recording device, a recording method, and a recording unit.

Description of the Related Art

There are known recording devices that record images by repeatedly executing recording scanning in which ink discharge is performed, where a recording unit that has a discharge port array in which multiple discharge orifices that discharge ink are arrayed, is relatively moved over an increment region of a recording medium. There has conventionally been demand for reduction in recording time on the recording medium regarding such recording devices. Japanese Patent Laid-Open No. 10-44519 describes using a recording unit, in which there are provided two recording parts, one to the left side and one to the right, in the scanning direction, to realize reduction in this recording time. Each recording part has multiple discharge orifice rows that discharge ink of multiple colors. Further described therein is discharging ink at the left side of the recording medium in the scanning direction only from the left-side recording part, and discharging ink at the right side of the recording medium in the scanning direction only from the right-side recording part. Accordingly, recording time can be reduced, since recording can be completed without the recording unit having to be scanned over the entire region from a position at the left edge portion of the recording medium to a corresponding position at the right edge portion of the recording medium.

Now, in a case of using the above-described recording unit to record the left and right sides of the recording medium in the scanning direction, using the respective left and right side recording parts, image quality at the boundary between the region recorded by the left-side recording part and the region recorded by the right-side recording part may deteriorate. In light of this point, Japanese Patent Laid-Open No. 10-44519 suppresses this deterioration in image quality by both the left-side recording part and the right-side recording part sharing recording of the middle portion in the scanning direction of the recording medium.

However, it has been found that, in a case of using a recording unit such as described above, with the recording part at one side and the recording part at the other side sharing recording of the middle portion in the scanning direction of the recording medium, unevenness in the recording may be conspicuous. This unevenness is due to discharge characteristics of the recording parts in images recorded by ink with a low lightness, depending on the array of discharge orifice rows within the recording unit.

In a case where there is difference in discharge characteristics among discharge orifice rows discharging ink of the same color provided to the recording part at one side and the recording part at the other side, due to manufacturing error, the image color will differ between a region recorded by the ink from one recording part and a region recorded by the ink from the other recording part. For example, in a case where there are differences in discharge characteristics, such as the discharge amount of the ink being greater at a discharge orifice row provided to one recording part as compared to a discharge orifice row provided to the other recording part, the region of the image recorded by the discharge orifice row provided to the one recording part (hereinafter referred to as "one region") will be darker than the region of the image recorded by the discharge orifice row provided to the other recording part (hereinafter referred to as "other region"). The greater the difference in lightness between the recording medium and the ink is, the more conspicuous this change in color is.

Even in such a case, even if there is change in discharge amount due to difference in discharge characteristics between discharge orifice rows, occurring among regions on the recording medium, when using ink with a high lightness such as yellow ink for example, change in lightness between one region and the other region is inconspicuous. Normally, the color of the recording medium being used has a lightness higher than that of the ink, such as white or the like, so the difference in lightness is smaller as compared to ink with a low lightness. Accordingly, even if there is change in the discharge amount due to difference in discharge characteristics, the difference in lightness at one region and the difference in lightness at the other region do not vary that much. Accordingly, change in lightness between one region and the other region is inconspicuous.

However, with regard to black ink, for example, that has a low lightness, the difference in lightness at one region and the difference in lightness at the other region may vary greatly, since the lightness difference between the recording medium and the ink is great. Accordingly, there may be cases where change in lightness between one region and the other region is conspicuous.

Even in a case of using ink with a low lightness, the change in lightness due to difference discharge characteristics can be made less conspicuous, by making the width of the portion shared by the recording part at one side and the recording part at the other side sharing recording, in the scanning direction of the recording medium, to be longer. The image recorded in the region shared by the recording part at one side and the recording part at the other side will be recorded at a color having a density between that of the color of the image in the region recorded only by one recording part and that of the color of the image in the region recorded only by the other recording part. Accordingly, the longer the width of the portion shared by the recording part at one side and the recording part at the other side sharing recording in the scanning direction is, the more gradual the change in lightness is between the region recorded by only one recording part and the region recorded by only the other recording part, and this less conspicuous.

Now, in a case where the layout order of multiple discharge orifice rows in the scanning direction is the same among the recording parts, the width in the scanning direction can be made longer for the region where shared recording is performed by the discharge orifice rows for ink with low lightness, by making the scanning range of the recording unit longer. This enables the above-described change in lightness to be made inconspicuous. However, the amount of time required per scan becomes longer in this case due to the longer scanning range of the recording unit, consequently taking longer to complete recording on the recording medium. Further, a larger movable range for the recording unit needs to be provided within the recording device to realizing the longer scanning range of the recording unit, which leads to increased size of the recording device.

SUMMARY OF THE INVENTION

It has been found desirable to provide a recording device that enables making change in lightness inconspicuous even if change in discharge amount occurs due to change in discharge characteristics among recording parts, without making the scanning range of the recording unit longer.

A recording device includes: a recording unit, a scanning unit, and a recording control unit. The recording unit includes a first recording part where there are provided at least a first discharge orifice row where a plurality of discharge orifices that discharge a first ink are arrayed in a predetermined direction, and a second discharge orifice row where a plurality of discharge orifices that discharge a second ink of a different color from the first ink are arrayed in the predetermined direction, and a second recording part where there are provided at least a third discharge orifice row where a plurality of discharge orifices that discharge the first ink are arrayed in the predetermined direction, and a fourth discharge orifice row where a plurality of discharge orifices that discharge the second ink are arrayed in the predetermined direction. The first recording part and the second recording part are separated from each other in an intersecting direction that intersects the predetermined direction. The scanning unit is configured to perform recording scanning by moving the recording unit. The recording control unit is configured to, in a same recording scan by the scanning unit, perform recording of a region on the recording medium in the intersecting direction, including one edge of the recording medium, by only the first recording part, perform recording of a region on the recording medium in the intersecting direction, including the other edge of the recording medium, by only the second recording part, and perform recording of a region on the recording medium between the region recorded only by the first recording part and the region recorded only by the second recording part in the intersecting direction, by both the first recording part and the second recording part. The second ink has a higher lightness than the first ink. A distance between the first discharge orifice row and the third discharge orifice row in the intersecting direction is a first distance, and a distance between the second discharge orifice row and the fourth discharge orifice row in the intersecting direction is a second distance that is longer than the first distance.

Further features of the disclosure will become apparent from the following description of exemplary embodiments with reference to the attached drawings.

BRIEF DESCRIPTION OF THE DRAWINGS

FIG. 2 is a diagram for describing a recording control system according to an embodiment.

FIG. 3 is a flowchart illustrating procedures of image processing according to an embodiment.

FIGS. 4A and 4B are schematic diagrams illustrating distribution patterns according to an embodiment.

FIG. 5 is a diagram illustrating lightness difference between inks and recording medium used in an embodiment.

FIG. 7 is a diagram for describing a recording system according to an embodiment.

DESCRIPTION OF THE EMBODIMENTS

First Embodiment

Figure 1:
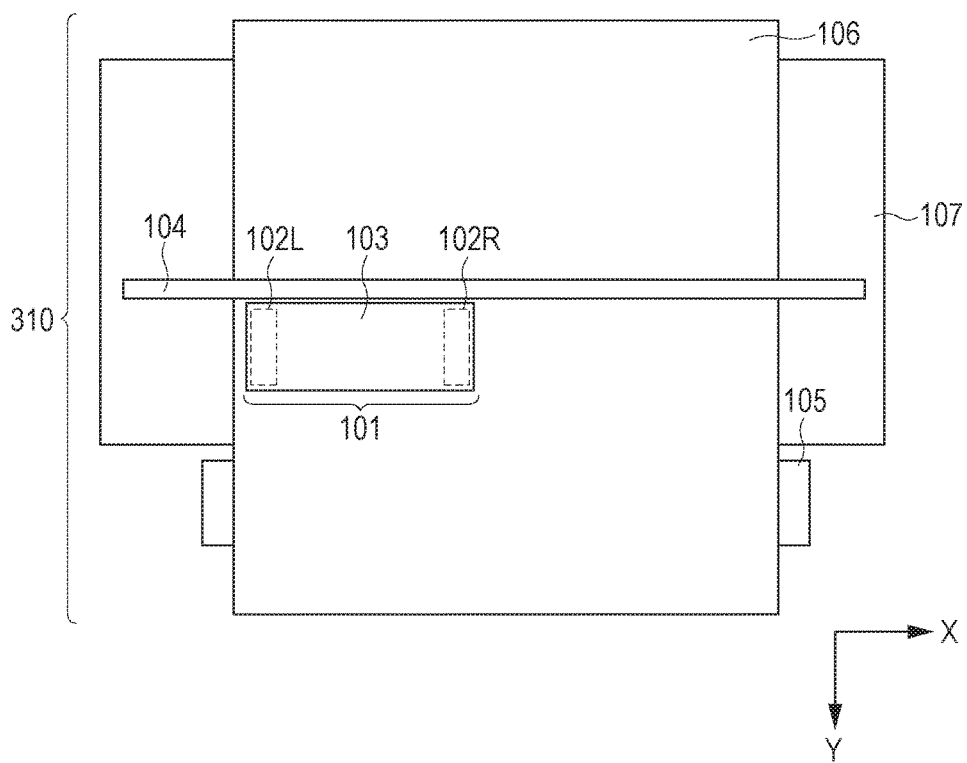
FIG. 1 is a schematic diagram illustrating the internal configuration of a recording device according to an embodiment.

A first embodiment will be described in detail below with reference to the drawings. FIG. 1 is a schematic diagram illustrating the internal configuration of an ink-jet recording device 310 according to an embodiment.

The ink-jet recording device (hereinafter also referred to as "printer", "recording device", and "image recording device") 310 according to the present embodiment has a recording unit 101. The recording unit 101 has a recording head 102L and a recording head 102R, the recording heads 102L and 102R being held by a single holding part 103. The recording heads 102L and 102R each have one discharge orifice row each for discharging black ink, cyan ink, magenta ink, and yellow ink, which will be described in detail later. A recording medium 106 that is almost white is used in the present embodiment, which will also be described in detail later.

It can be seen from FIG. 1 that the recording heads 102L and 102R are at the same position in the Y direction and separated from each other in the X direction. Although the recording unit 101 is described here with the recording heads 102L and 102R being situated at the same position in the Y direction, this is not restrictive. The recording heads 102L and 102R may be provided at positions offset in the Y direction, as long as configured with a recording region corresponding to discharge orifice rows discharging ink of the respective colors partially overlapping in the Y direction, such that at least a partial region on the recording medium 106 can be recorded by both of the recording heads 102L and 102R in the same scan.

The recording unit 101 is capable of reciprocally moving relative to the recording medium 106, in the X direction (intersecting direction) along a guide rail 104 provided extending in the X direction. The recording medium 106 is conveyed in the Y direction (conveyance direction) by rotating a conveyance roller 105. The recording medium 106 is supported by a platen 107 provided at a position facing the recording unit 101 while the recording unit 101 is being scanned or the recording medium 106 is being conveyed. The ink-jet recording device 310 according to the present embodiment completes recording on the entire region of the recording medium 106 by repeatedly performing recording operations where the recording unit 101 is scanned in the X direction, and conveyance operations of the recording medium 106 in the Y direction by the conveyance roller 105.

Using the recording unit 101 having two recording heads 102L and 102R enables recording to be performed with reduced recording time as compared to using a conventional single recording head. The reason is that the recording unit does not have to move from one end of the recording medium in the X direction to the other end, as with conventional arrangements. In a case of using the recording unit 101 such as described above, the entire region of the recording medium 106 in the X direction can be recorded by moving the above-described recording unit 101 such that at least one of two discharge orifice rows of the same color ink provided to each of the recording heads 102L and 102R faces the recording medium 106. In this case, of the two discharge orifice rows discharging ink of the same color in the recording heads 102L and 102R, the region to the left in the X direction on the recording medium 106 is recorded by the discharge orifice row within the recording head 102L alone, and the region to the right in the X direction by the discharge orifice row within the recording head 102R alone. Further, shared recording of a region at the middle in the X direction is performed by both the discharge orifice row in the recording head 102L and the discharge orifice row in the recording head 102R. This recording control will be described in detail later.

FIG. 2 is a block diagram illustrating a schematic configuration of a recording control system according to the present embodiment. The recording control system according to the present embodiment is made up of the printer 310 illustrated in FIG. 1, and a personal computer (hereinafter "PC") 300 serving as a host device thereof.

The PC 300 is configured having the following components. A central processing unit (CPU) 301 executes processing following programs held in random access memory (RAM) 302 or a hard disk drive (HDD) 303 serving as storage. The RAM 302 is volatile memory, and temporarily stores programs and data. The HDD 303 is nonvolatile memory, and also stores programs and data. A data transfer interface 304 controls exchange of data with the printer 310 in the present embodiment. Examples of connection standards that can be used for this data exchange include USB, IEEE 1394, and IEEE 802. A keyboard and mouse interface 305 is an interface that controls human interface devices (HIDs) such as keyboards, mice, etc., by which the user can perform input. A display interface 306 controls display performed at a display unit (omitted from illustration).

On the other hand, the printer 310 is configured having the following components. A CPU 311 executes later-described processing following programs held in RAM 312 or read-only memory (ROM) 313. The RAM 312 is volatile memory, and temporarily stores programs and data. The ROM 313 is nonvolatile memory, and can store table data and programs used in later-described processing. A data transfer interface 314 controls exchange of data with the PC 300.

A left head controller 315L and a right head controller 315R respectively supply recording data to the recording head 102L and recording head 102R illustrated in FIG. 1, and also control discharge operations of each of the recording heads 102L and 102R (discharge control). Specifically, the left head controller 315L may have a configuration of reading control parameters and recording data from a predetermined address of the RAM 312. Upon the CPU 311 writing control parameters and recording data to this predetermined address of the RAM 312, processing is activated by the left head controller 315L, and ink discharge is performed from the recording head 102L. This is the same regarding the right head controller 315R, in when the CPU 311 writes control parameters and recording data to a predetermined address of the RAM 312, processing is activated by the right head controller 315R, and ink discharge is performed from the recording head 102R.

Data Processing Procedures

FIG. 3 is a flowchart of processing for generating recording data used for recording, executed by the CPU 311 following a control program according to the present embodiment. Note that this control program is stored in the ROM 313 beforehand.

When RGB data in RGB format is acquired at the recording device 310 from the PC 300, color conversion processing is first performed in step S801, to convert the RGB data into ink color data corresponding to the colors of inks used for recording. This color conversion processing generates ink color data represented in 8-bit 256-color information that sets the lightness for each of multiple pixels. The present embodiment uses black ink, cyan ink, magenta ink, and yellow ink in the present embodiment as described above, so ink color data is generated by color conversion processing in step S801 that corresponds to each of the black ink, cyan ink, magenta ink, and yellow ink. Different processing may be executed as appropriate for the color conversion processing, or a three-dimensional look-up table (3D-LUT) stipulating the correspondence between RGB values and CMYK values that is stored in the ROM 313 beforehand for example, or further, tetrahedral interpolation may be performed.

Next, in step S802, tone correction processing where tone values indicated by ink color data for each of the CMYK values are corrected, and tone correction data where the CMYK values are expressed in the form of 8-bit 256-color information is generated. A one-dimensional look-up table (1D-LUT), stipulating the correspondence between ink color data corresponding to each color ink before correction and tone correction data corresponding to each color ink after correction, or the like, may be used in this tone correction processing, for example. Note that the 1D-LUT is stored in the ROM 313 beforehand.

In step S803, quantization processing is performed where the tone correction data is quantized, and quantization data (image data) expressed in the form of 1-bit binary information, setting discharge/non-discharge of ink for each color corresponding to each pixel, is generated. Various conventionally-known types of processing, such as error diffusion, dithering, etc., may be applied to the quantization processing.

Next, in step S804, distribution processing is performed where, of the quantization data corresponding to each ink color, and quantization data corresponding to the region at the middle of the recording medium in the X direction, where shared recording is to be performed, is distributed to the recording head 102L and recording head 102R. Further, the logical sum is obtained in this distribution processing for quantization data distributed to the recording head 102L and quantization data corresponding to the region at the left side of the recording medium in the X direction where shared recording is not performed, thereby generating distribution data corresponding to the recording head 102L, in which is set discharge/non-discharge of ink of each color from the recording head 102L as to the recording medium, regarding each pixel. In the same way, the logical sum is obtained for quantization data distributed to the recording head 102R and quantization data corresponding to the region at the right side of the recording medium in the X direction where shared recording is not performed, thereby generating distribution data corresponding to the recording head 102R, in which is set discharge/non-discharge of ink of each color from the recording head 102R as to the recording medium, regarding each pixel. This left-right recording head distribution processing will be described later.

Then in step S805L, the distribution data corresponding to the recording head 102L is distributed to multiple scans (passes) performed over the same unit region on the recording medium, and recording data for the recording head 102L, used for discharging ink from the recording head 102L in each of the multiple scans, is generated. In the same way, in step S805R, the distribution data corresponding to the recording head 102L is distributed to multiple scans, and recording data for the recording head 102R, used for discharging ink from the recording head 102R in each of the multiple scans, is generated. Discharging operations for discharging from the recording heads 102L and 102R are executed according to the recording data for the recording heads 102L and 102R generated in steps S805L and S805R. Note that the processing in steps S805L and S805R can be carried out by using multiple mask patterns having layouts of recording-permitted pixels regarding which recording is permitted, and recording-non-permitted pixels regarding which recording is not permitted, corresponding to multiple scans, for example. These multiple mask patterns are stored in the ROM 313 beforehand.

Although an arrangement where multiple scans are performed as to one unit region has been described, a unit region may be scanned just once. In this case, the processing in steps S805L and S805R can be omitted. Also, although an arrangement has been described here where the CPU 311 in the printer 310 performs all of the processing from step S801 through steps S805L and S805R, the CPU 301 in the PC 300 may perform part or all of the processing from step S801 through steps S805L and S805R.

FIGS. 4A and 4B are schematic diagrams illustrating an example of distribution patterns used in the left-right head distribution processing in step S804 in the present embodiment. FIG. 4A corresponds to a certain color, and is a diagram schematically illustrating a distribution pattern for distributing quantization data corresponding to an image in a region at the middle of the recording medium in the X direction, where shared recording by two discharge orifice rows provided to the recording heads 102L and 102R, to the discharge orifice row provided to the recording head 102L. FIG. 4B corresponds to the same certain color, and is a diagram schematically illustrating a distribution pattern for distributing the quantization data to the discharge orifice row provided to the recording head 102R. Note that these distribution patterns are stored in the ROM 313 beforehand.

To simplify explanation here, description will be made regarding an arrangement where the region at the middle in the X direction where shared recording is performed is a region that has a size of 14 pixels in the X direction. Accordingly, the distribution patterns illustrated in FIGS. 4A and 4B, corresponding to the discharge orifice rows provided to the recording heads 102L and 102R, also have a size of 14 pixels in the X direction. Note however, that the size of the region at the middle in the X direction where shared recording is performed differs in size depending on what color ink the discharge orifice rows discharge in the present embodiment, which will be described later. Advantages of the present embodiment can be yielded in such cases as well, as long as the distribution patterns satisfy later-described conditions.

The distribution patterns illustrated in FIGS. 4A and 4B are configured with an 8-pixel size in the Y direction as a repetition unit, and the left-right head distribution processing is completed as to the entirety of the region where shared recording is to be performed, by repeatedly using these distribution patterns in the Y direction. In the distribution patterns illustrated in FIGS. 4A and 4B, the black pixels indicate pixels regarding which discharging of ink is permitted in a case where ink discharge is set by the quantization data. On the other hand, the white pixels indicate pixels regarding which discharging of ink is not permitted, even in a case where ink discharge is set by the quantization data.

It can be seen from FIGS. 4A and 4B that the distribution pattern corresponding to the discharge orifice row provided to the recording head 102L used in the present embodiment, and the distribution pattern corresponding to the discharge orifice row provided to the recording head 102R have ink discharge permitted at mutually exclusive and complementary positions. Accordingly, left-right head distribution processing can be performed so that in a case where quantization data instructing discharge of ink to all pixels is acquired as the quantization data corresponding to the region where shared recording is to be performed, for example, ink is discharged just once, from either one or the other of a discharge orifice row in the recording head 102L and a discharge orifice row in the recording head 102R, at all pixels within this region.

Further, it can be seen from FIGS. 4A and 4B that the distribution pattern corresponding to the discharge orifice row in the recording head 102L and the distribution pattern corresponding to the discharge orifice row in the recording head 102R, used in the present embodiment, each have half of the total number of pixels permitted to discharge ink, regardless of the position in the X direction on the recording medium. Accordingly, in a case of using the distribution patterns illustrated in FIGS. 4A and 4B, the distribution ratio of quantization data to the discharge orifice row of the recording head 102L and of quantization data to the discharge orifice row of the recording head 102R is 50% each in the region where shared recording is performed. Thus, the total of the distribution ratio of quantization data to the discharge orifice row of the recording head 102L and of quantization data to the discharge orifice row of the recording head 102R is 100% in the region where shared recording is performed as well, so the discharge amount of ink as to the region where shared recording is performed is not greatly different from the discharge amount desirable for the regions where shared recording is not performed.

The data processing procedures such as described above are used in the present embodiment to generate recording data used for recording based on acquired RGB data, and to control ink discharge from the recording unit 101 following the recording data.

Composition of Ink

The compositions of the cyan ink, magenta ink, yellow ink, and black ink, used in the present embodiment, will each be described in detail. Note that in the following description, "parts" and "%" are to be understood to be "parts by mass" and "% by mass", unless specifically stated otherwise.

1. Cyan Ink

The cyan ink used in the present embodiment contains C.I. Direct Blue 199, which is a dye, as a color material. Specifically, the cyan ink used in the present embodiment is prepared by blending and agitating the following components, followed by filtration under pressure using a microfilter.

| | |
|---|---|
| C.I. Direct Blue 199 | 3% |
| Diethylene Glycol | 10% |
| Isopropyl Alcohol | 2% |
| Urea | 5% |
| Acetylenol EH (Manufactured by | 1% |

-continued

| | |
|---|---|
| Kawaken Fine Chemicals Co., Ltd.) | |
| Ion-exchanged water | 79% |

2. Magenta Ink

The magenta ink used in the present embodiment contains C.I. Acid Red 289, which is a dye, as a color material. Specifically, the magenta ink used in the present embodiment is prepared by blending and agitating the following components, followed by filtration under pressure using a micro-filter.

| | |
|---|---|
| C.I. Acid Red 289 | 3% |
| Diethylene Glycol | 10% |
| Isopropyl Alcohol | 2% |
| Urea | 5% |
| Acetylenol EH (Manufactured by Kawaken Fine Chemicals Co., Ltd.) | 1% |
| Ion-exchanged water | 79% |

3. Yellow Ink

The yellow ink used in the present embodiment contains C.I. Direct Yellow 86, which is a dye, as a color material. Specifically, the yellow ink used in the present embodiment is prepared by blending and agitating the following components, followed by filtration under pressure using a micro-filter.

| | |
|---|---|
| C.I. Direct Yellow 86 | 3% |
| Diethylene Glycol | 10% |
| Isopropyl Alcohol | 2% |
| Urea | 5% |
| Acetylenol EH (Manufactured by Kawaken Fine Chemicals Co., Ltd.) | 1% |
| Ion-exchanged water | 79% |

4. Black Ink

The black ink used in the present embodiment contains C.I. Direct Black 154, which is a dye, as a color material. Specifically, the black ink used in the present embodiment is prepared by blending and agitating the following components, followed by filtration under pressure using a micro-filter.

| | |
|---|---|
| C.I. Direct Black 154 | 3% |
| Diethylene Glycol | 10% |
| Isopropyl Alcohol | 2% |
| Urea | 5% |
| Ion-exchanged water | 80% |

It can be seen from the above that of the inks used in the present embodiment, the cyan ink, magenta ink, and yellow ink, which are color ink, contain acetylenol EH. On the other hand, the black ink does not contain acetylenol EH.

Now, acetylenol EH is a type of acetylene glycol surfactant, and aids in improving the permeability of ink. The fixability of color ink according to the present embodiment as to the recording embodiment is improved by containing acetylenol EH, which improves permeability as to the recording medium and speeds up the permeation speed.

On the other hand, in a case where the permeation speed of ink is increased, a phenomenon may occur where the ink spreads following fibers of the recording medium after having been deposited thereupon. This phenomenon leads to so-called "feathering", where ink spreads on the recording medium. Feathering particularly leads to poor image quality in the case of recording character images and fine-line images. Accordingly, since black ink is often used in recording character images and fine-line images, the black ink according to the present embodiment does not contain acetylenol EH, thereby suppressing occurrence of feathering by keeping the permeability low.

Difference in Lightness Between Ink and Recording Medium

Comparing images where ink with high lightness and ink with low lightness are each applied to a recording medium shows that the change in lightness between regions recorded by the recording heads 102L and 102R is conspicuous in the ink with low lightness. In a case where there is difference in discharge characteristics between the two discharge orifice rows discharging ink of the same color in the recording heads 102L and 102R, due to manufacturing error or the like, the amount of discharge will differ between the two. In a case where the amount of discharge increases/decreases at one of the discharge orifice rows, the lightness after fixation is lower/higher.

Now, giving thought to ink with a low lightness (e.g., black ink) and ink with a high lightness (e.g., yellow ink), and a recording medium that has a higher lightness than normally-used ink (e.g., a white recording medium), the difference in lightness between the ink and recording medium is greater for the ink with the low lightness. Accordingly, in a case where there is difference in discharge amount between the two discharge orifice rows in the recording heads 102L and 102R, due to difference in discharge characteristics at one of the recording heads 102L and 102R, the difference in lightness between the recording medium and fixed ink in the region recorded by the discharge orifice row in the recording head 102L alone, and the difference in lightness between the recording medium and fixed ink in the region recorded by the discharge orifice row in the recording head 102R alone, will be greater the lower the lightness of the ink is. Accordingly, the difference in lightness at the region recorded by the recording head 102L and the difference in lightness at the region recorded by the recording head 102R is greater the lower the lightness of the ink is, so change in lightness between the regions is more conspicuous.

In light of the above, the layout order of discharge orifice rows in the recording heads 102L and 102R that discharge the inks is decided based on the lightness of each ink being used in the present embodiment, which will be described later. FIG. 5 is a diagram illustrating measurement results of the lightness of the inks used in the present embodiment, and of the surface of the recording medium.

Measurements showed that the lightness $L^*$ of the recording medium was 95, which is a high value, the surface of the recording medium being almost white. On the other hand, the lightness $L^*$ of the black ink, cyan ink, magenta ink, and yellow ink was 5, 45, 50, and 90, respectively. Further, the lightness difference $\Delta L^*$ between the black ink, cyan ink, magenta ink, and yellow ink and the surface of the recording medium was 90, 50, 45, and 5, respectively. It can thus be seen that of the inks used in the present embodiment, the ink of which the change in lightness between the regions described above is most conspicuous is the black ink that has the lowest lightness.

Details of Recording Unit

The recording unit 101 used in the present embodiment can make the above-described change in lightness inconspicuous for ink with low lightness, by arrangement of the array in the X direction of multiple discharge orifice rows discharging ink of multiple colors in the recording head 102L, and arrangement of the array in the X direction of multiple discharge orifice rows discharging ink of multiple colors in the recording head 102R, without increasing the recording time or size of the recording device. Specifically, the present embodiment uses a recording unit where the distance between discharge orifice rows in the recording heads 102L and 102R discharging ink with low lightness is shorter than the distance between discharge orifice rows in the recording heads 102L and 102R discharging ink with high lightness.

Figure 6A:
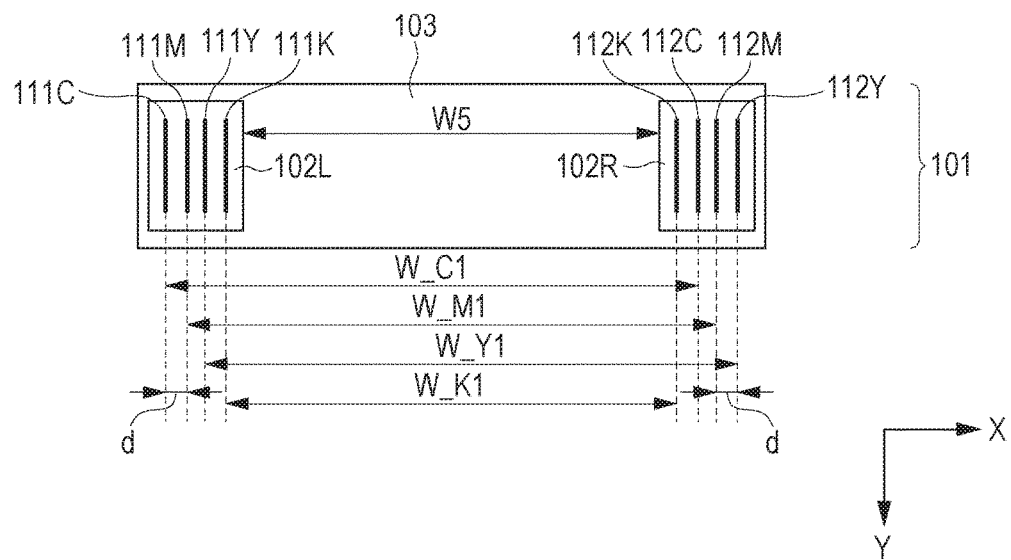
FIGS. 6A and 6B are diagrams illustrating in detail a recording unit used in an embodiment.
Figure 6B:
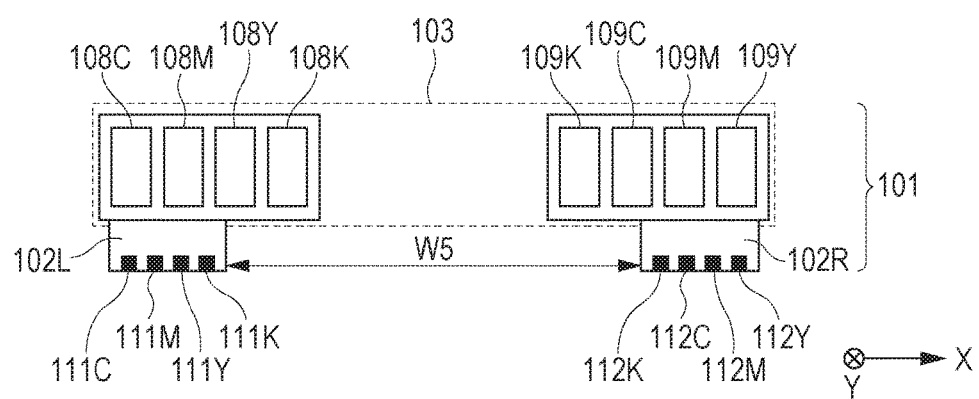

FIGS. 6A and 6B are diagrams illustrating the recording unit 101 used in the present embodiment in detail. FIG. 6A schematically illustrates the recording unit 101 from below in the vertical direction as to the XY plane. FIG. 6B schematically illustrates the recording unit 101 as viewed from the Y direction.

The recording head 102L and the recording head 102R in the recording unit 101 according to the present embodiment are separated by a distance W5 in the X direction. The recording head 102L has four discharge orifice rows 111C, 111M, 111Y, and 111K, in the order of discharge orifice row 111C that discharges cyan ink, discharge orifice row 111M that discharges magenta ink, discharge orifice row 111Y that discharges yellow ink, and discharge orifice row 111K that discharges black ink, from the left side in the X direction. On the other hand, the recording head 102R has four discharge orifice rows 112C, 112M, 112Y, and 112K, in the order of discharge orifice row 112K that discharges black ink, discharge orifice row 112C that discharges cyan ink, discharge orifice row 112M that discharges magenta ink, and discharge orifice row 112Y that discharges yellow ink, from the left side in the X direction.

Note that the four discharge orifice rows 111C, 111M, 111Y, and 111K in the recording head 102L are laid out separated from each other by a same distance d. In the same way, the four discharge orifice rows 112C, 112M, 112Y, and 112K in the recording head 102R are laid out separated from each other by the same distance d. The eight discharge orifice rows each have multiple discharge orifices (omitted from illustration) that discharge ink, arrayed in the Y direction (predetermined direction).

The discharge orifices within each discharge orifice row in the recording head 102L are connected to an ink tank accommodating the respective ink, via channels omitted from illustration. In detail, the discharge orifices arrayed in the discharge orifice row 111C are connected to an ink tank 108C accommodating cyan ink, the discharge orifices arrayed in the discharge orifice row 111M are connected to an ink tank 108M accommodating magenta ink, the discharge orifices arrayed in the discharge orifice row 111Y are connected to an ink tank 108Y accommodating yellow ink, and the discharge orifices arrayed in the discharge orifice row 111K are connected to an ink tank 108K accommodating black ink. In the same way, in the recording head 102R the discharge orifices arrayed in the discharge orifice row 112C are connected to an ink tank 109C accommodating cyan ink, the discharge orifices arrayed in the discharge orifice row 112M are connected to an ink tank 109M accommodating magenta ink, the discharge orifices arrayed in the discharge orifice row 112Y are connected to an ink tank 109Y accommodating yellow ink, and the discharge orifices arrayed in the discharge orifice row 112K are connected to an ink tank 109K accommodating black ink.

Although an arrangement has been described here where the discharge orifice rows in the recording head 102L and the discharge orifice rows in the recording head 102R that discharge ink of the same color are connected to different ink tanks, discharge orifice rows that discharge ink of the same color may be connected to the same single tank. Regardless of whether different ink tanks are used or the same ink tank is used, providing the ink tank(s) at the middle of the holding part 103 in the X direction enables the recording unit 101 to be reduced in size. However, if reduction in size is not an issue, and two different ink tanks are to be used, a design may be made where the middle portions of the respective ink heads and the ink tanks in the X direction generally agree, for example.

Now, the distance in the X direction between two discharge orifice rows that discharge ink of the same color in the present embodiment will be described for each of the colors. In order to simplify description, the width in the X direction of the discharge orifice rows, and the width in the X direction of regions at the edges within the recording heads where no discharge orifice rows are formed, will be disregarded.

First, with regard to the cyan ink, the discharge orifice row 111C is situated the fourth from the right side in the X direction within the recording head 102L, and the discharge orifice row 112C is situated the second from the left side in the X direction within the recording head 102R. Accordingly, distance $W\_C1$ in the X direction between the discharge orifice row 111C and discharge orifice row 112C is a distance that can be calculated by Expression (1-1).

$$W\_C1 = W5 + 3 \times d + 1 \times d = W5 + 4d \qquad \text{Expression (1-1)}$$

Now, the term "3×d" in Expression (1-1) is a term corresponding to the fact that there are three discharge orifice rows to the right of the discharge orifice row 111C in the X direction within the recording head 102L. The term "1×d" in Expression (1-1) is a term corresponding to the fact that there is one discharge orifice row to the left of the discharge orifice row 112C in the X direction within the recording head 102R.

In the same way, with regard to the magenta ink, the discharge orifice row 111M is situated the third from the right side in the X direction within the recording head 102L, and the discharge orifice row 112M is situated the third from the left side in the X direction within the recording head 102R. Accordingly, distance $W\_M1$ in the X direction between the discharge orifice row 111M and discharge orifice row 112M is a distance that can be calculated by Expression (1-2).

$$W\_M1 = W5 + 2 \times d + 2 \times d = W5 + 4d \qquad \text{Expression (1-2)}$$

Also, with regard to the yellow ink, the discharge orifice row 111Y is situated the second from the right side in the X direction within the recording head 102L, and the discharge orifice row 112Y is situated the fourth from the left side in the X direction within the recording head 102R. Accordingly, distance $W\_Y1$ in the X direction between the discharge orifice row 111Y and discharge orifice row 112Y is a distance that can be calculated by Expression (1-3).

$$W\_Y1 = W5 + 1 \times d + 3 \times d = W5 + 4d \qquad \text{Expression (1-3)}$$

Further, with regard to the black ink, the discharge orifice row 111K is situated the first from the right side in the X direction within the recording head 102L, and the discharge orifice row 112K is situated the first from the left side in the X direction within the recording head 102R. Accordingly, distance $W\_K1$ in the X direction between the discharge orifice row 111K and discharge orifice row 112K is a distance that can be calculated by Expression (1-4).

$$W\_K1 = W5 + 0 \times d + 0 \times d = W5 \qquad \text{Expression (1-4)}$$

It can thus be seen from Expressions (1-1), (1-2), (1-3), and (1-4), that in the recording unit 101 used in the present embodiment, the discharge orifice rows are arranged such that the distance W_K1 (W5) between the discharge orifice rows 111K and 112K that discharge black ink is shorter than the distance W_C1 between the discharge orifice rows 111C and 112C that discharge cyan ink, the distance W_M1 between the discharge orifice rows 111M and 112M that discharge magenta ink, and the distance W_Y1 between the discharge orifice rows 111Y and 112Y that discharge yellow ink, which are all (W5+4d). Thus, the multiple discharge orifice rows that discharge multiple colors of ink are arrayed in the multiple recording heads such that the distance between discharge orifice rows discharging ink with low lightness is shorter than the distance between discharge orifice rows discharging ink with high lightness in the recording unit according to the present embodiment.

Recording Control of Recording Unit

Next, a mechanism will be described in detail which can make the change in lightness inconspicuous for ink that has great difference in lightness as to the surface of the recording medium, without increasing the recording time or size of the recording device, by using the recording unit illustrated in FIGS. 6A and 6B. FIG. 7 is a diagram for describing the way in which recording is performed on the recording medium 106 using the recording unit 101 according to the present embodiment. Of the two recording units 101 illustrated in FIG. 7, the recording unit 101 situated at the left side in the X direction and drawn using dashed lines schematically illustrates the scan start position of the recording unit 101 when scanning the recording unit 101 from the left side toward the right side in the X direction, while the recording unit 101 situated at the right side in the X direction and drawn using solid lines schematically illustrates the scan end position of the recording unit 101. In order to simplify description, just the four discharge orifice rows of the discharge orifice rows 111K and 112K that discharge black ink, having the lowest lightness, and the discharge orifice rows 111Y and 112Y that discharge yellow ink, having the highest lightness, will be described.

The recording unit 101 according to the present embodiment is scanned over a range from where the discharge orifice row situated at the right edge portion of the recording head 102L in the X direction is at a position facing an edge position X1 at the left edge of the recording medium 106 in the X direction, to where the discharge orifice row situated at the left edge portion of the recording head 102R in the X direction is at a position facing an edge position X2 at the right edge of the recording medium 106 in the X direction. The recording unit 101 can be scanned over this range by the recording unit 101 being moved by a distance ΔX1. Thus, according to the present embodiment, the recording unit does not have to be moved over the entire region from one edge of the recording medium in the X direction to the other edge as in conventional arrangements, so recording can be performed with reduced recording time.

Hereinafter, a position on the recording medium in the X direction that the discharge orifice row 112K within the recording head 102R faces at the scan start position of the recording unit 101 will be defined as position X3, and a position on the recording medium in the X direction that the discharge orifice row 112Y within the recording head 102R faces will be defined as position X5. Also, a position on the recording medium in the X direction that the discharge orifice row 111K within the recording head 102L faces at the scan end position of the recording unit 120 will be defined as position X4, and a position on the recording medium in the X direction that the discharge orifice row 111Y within the recording head 102L faces will be defined as position X6.

It can be seen from FIG. 7 that, in a case of scanning the recording unit 101 for the distance ΔX1, the discharge orifice row 112K for black ink in the recording head 102R cannot face a region on the recording medium 106 to the left side of the position X3 in the X direction. Accordingly, black ink can only be discharged from the discharge orifice row 111K in the recording head 102L to the region A1 on the recording medium 106 from the edge position X1 to the position X3. It can similarly be seen that the discharge orifice row 111K for black ink in the recording head 102L cannot face a region on the recording medium 106 to the right side of the position X4 in the X direction. Accordingly, black ink can only be discharged from the discharge orifice row 112K in the recording head 102R to the region A3 on the recording medium 106 from the position X4 to the edge position X2. The region A2 on the recording medium 106 from positions X3 to X4 can be faced by both the discharge orifice row 111K in the recording head 102L and the discharge orifice row 112K in the recording head 102R while scanning the recording unit 101 over the distance ΔX1.

In light of this point, black ink is not discharged from the discharge orifice row 112K as to the region A1 on the recording medium 106; black ink is discharged to the region A1 only from the discharge orifice row 111K in the present embodiment. Also, black ink is not discharged from the discharge orifice row 111K as to the region A3 on the recording medium 106; black ink is discharged to the region A3 only from the discharge orifice row 112K. Further, black ink is discharged to the region A2 on the recording medium 106 from both the discharge orifice row 111K and the discharge orifice row 112K.

On the other hand, it can be seen from FIG. 7 that, in a case of scanning the recording unit 101 for the distance ΔX1, the discharge orifice row 112Y for yellow ink in the recording head 102R cannot face a region on the recording medium 106 to the left side of the position X5 in the X direction. Accordingly, yellow ink can only be discharged from the discharge orifice row 111Y in the recording head 102L to the region A4 on the recording medium 106 from the edge position X1 to the position X5. Note that position X5 is a position further to the right side in the X direction than the position X3. Accordingly, the distance of the region A4 in the X direction is longer than the distance of the region A1 in the X direction.

It can similarly be seen that the discharge orifice row 111Y for yellow ink in the recording head 102L cannot face a region on the recording medium 106 to the right side of the position X6 in the X direction while scanning the recording unit 101 over the distance ΔX1. Accordingly, yellow ink can only be discharged from the discharge orifice row 112Y in the recording head 102R to the region A6 on the recording medium 106 from the position X6 to the edge position X2. Note that position X6 is a position further to the left side in the X direction than the position X4. Accordingly, the distance of the region A6 in the X direction is longer than the distance of the region A3 in the X direction.

The region A5 on the recording medium 106 from positions X5 to X6 can be faced by both the discharge orifice row 111Y in the recording head 102L and the discharge orifice row 112Y in the recording head 102R while scanning the recording unit 101 over the distance ΔX1. Position X5 is situated further to the right side in the X direction than position X3, and position X6 is situated further to the left side in the X direction than position X4, so the width of region A5 in the X direction is shorter than the width of the region A2 in the X direction.

In light of this point, yellow ink is not discharged from the discharge orifice row 112Y as to the region A4 on the recording medium 106 in the present embodiment; yellow ink is discharged to the region A4 only from the discharge orifice row 111Y. Also, yellow ink is not discharged from the discharge orifice row 111Y as to the region A6 on the recording medium 106; yellow ink is discharged to the region A6 only from the discharge orifice row 112Y. Further, yellow ink is discharged to the region A5 on the recording medium 106 from both the discharge orifice row 111Y and the discharge orifice row 112Y.

Further, controlling discharge of black ink from the discharge orifice rows 111K and 112K, and discharge of yellow ink from the discharge orifice rows 111Y and 112Y, while scanning the recording unit 101 over the distance ΔX1, enables the entire region of the recording medium 106 to be recorded while shortening the recording time. Further, with regard to black ink that has a low lightness, the region A1 where recording is performed by the discharge orifice row 111K alone and the region A3 where recording is performed by the discharge orifice row 112K alone can be placed further apart. Accordingly, even in a case where discharge characteristics are different at one of the discharge orifice row 111K and discharge orifice row 112K, the change in lightness between the region A1 and the region A3 can be made to be inconspicuous.

Figure 8:
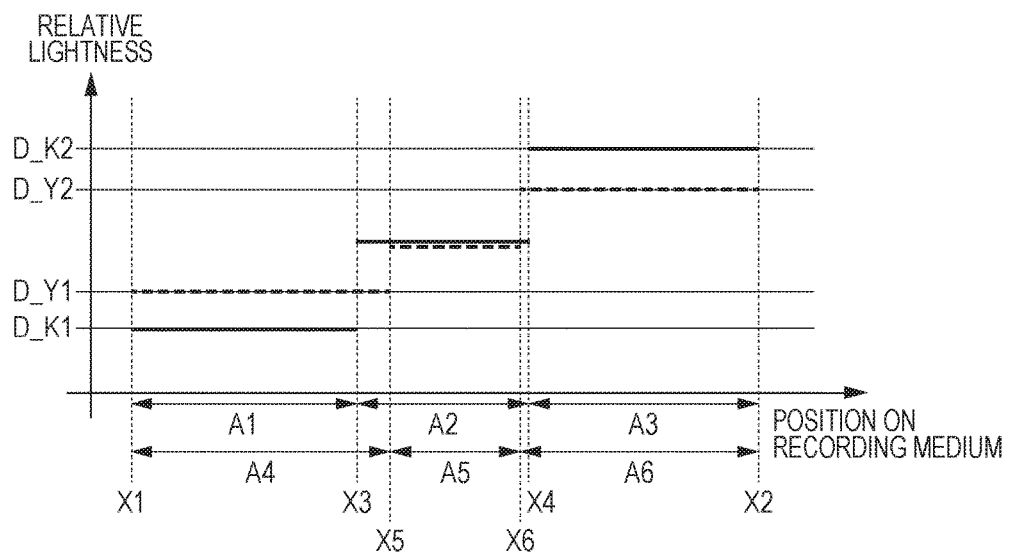
FIG. 8 is a diagram schematically illustrating change in lightness in a case of applying an embodiment.

FIG. 8 is a diagram for describing change in lightness in a case where difference in discharge characteristics has occurred at one of the recording head 102L and recording head 102R, and that the amount of discharge from discharge orifice rows in the recording head 102L has become greater than the amount of discharge from discharge orifice rows in the recording head 102R. A case is illustrated here where the degree of difference in discharge characteristics occurring among the discharge orifice rows is around the same for each color. The horizontal axis represents the position on the recording medium and the vertical axis represents the relative lightness of images recorded by each of black ink and yellow ink. In the present embodiment, the aforementioned relative lightness of an image is obtained by recording the entire region in the X direction by ink of a single color, calculating the difference in lightness between the image of ink of one color and the recording medium in each region, and obtaining the ratio in difference in lightness at each position as to an average of the difference in lightness.

FIG. 8 illustrates the relative lightness of images recorded by black ink using solid lines, and the relative lightness of images recorded by yellow ink using dashed lines. FIG. 8 also assumes a case where the generated recording data is such that the amount of discharge for both black ink and yellow ink would be the same regardless the position on the recording medium in the X direction, had there been no difference in discharge characteristics. Although the average in difference in lightness for the black ink and the average in difference in lightness for the yellow ink actually are different, FIG. 8 illustrates the relative lightness shifted in the lightness direction so that the average in difference in lightness for the black ink and the average in difference in lightness for the yellow ink agree, for sake of simplifying description.

First, the change in lightness of the images recorded by the yellow ink will be described. Yellow ink is discharged to the region A4 from edge position X1 to position X5 by the discharge orifice row 111Y alone, as described above. The discharge orifice row 111Y has a greater discharge amount. Accordingly, the relative lightness D_Y1 of the image recorded in the region A4 by the yellow ink is a relatively low value.

On the other hand, yellow ink is discharged to the region A6 from position X6 to edge position X2 by the discharge orifice row 112Y alone. The discharge orifice row 112Y has a smaller discharge amount. Accordingly, the relative lightness D_Y2 of the image recorded in the region A6 by the yellow ink is a relatively high value.

Yellow ink is discharged to the region A5 from position X5 to position X6 by both the discharge orifice row 111Y that has a greater discharge amount and the discharge orifice row 112Y that has a smaller discharge amount, in a shared manner. Accordingly, the relative lightness of the image recorded in the region A5 by the yellow ink is a value around the middle between D_Y1 and D_Y2.

Now, the difference in lightness as to the recording medium is small since the lightness of yellow ink is high. Accordingly, a relative lightness difference D_Y2−D_Y1, which is the difference between the relative lightness D_Y1 in region A4 and the relative lightness D_Y2 in region A6 also is relatively smaller. Thus, although the distance between the region A4 where the image with the low relative lightness D_Y1 is recorded and the region A6 where the image with the high relative lightness D_Y2 is recorded is short, the relative lightness difference D_Y2−D_Y1 is small, so the change in lightness in the X direction is gradual. Accordingly, change in lightness of yellow ink is inconspicuous.

Next, the change in lightness of the images recorded by the black ink will be described. Black ink is discharged to the region A1 from edge position X1 to position X3 by the discharge orifice row 111K alone, as described above. The discharge orifice row 111K has a greater discharge amount. Accordingly, the relative lightness D_K1 of the image recorded in the region A1 by the black ink is a relatively low value.

On the other hand, black ink is discharged to the region A3 from position X4 to edge position X2 by the discharge orifice row 112K alone. The discharge orifice row 112K has a smaller discharge amount. Accordingly, the relative lightness D_K2 of the image recorded in the region A3 by the black ink is a relatively high value.

Black ink has a lower lightness than yellow ink, so the difference in lightness of black ink as to the recording medium is greater as compared to that of yellow ink. Accordingly, the relative lightness D_K1 is greater than the relative lightness D_Y1, and the relative lightness D_K2 is smaller than the relative lightness D_Y2.

Black ink is discharged to the region A2 from position X3 to position X4 by both the discharge orifice row 111K that has a greater discharge amount and the discharge orifice row 112K that has a smaller discharge amount. Accordingly, the relative lightness of the image recorded in the region A2 by the black ink is a value around the middle between D_K1 and D_K2.

As described above, the difference in lightness as to the recording medium is great, since the lightness of black ink is low. Accordingly, a relative lightness difference D_K2−D_K1, which is the difference between the relative lightness D_K1 in region A1 and the relative lightness D_K2 in region A3 also is relatively great. However, the distance between the region A1 where the image with the low relative lightness D_K1 is recorded and the region A3 where the image with the high relative lightness D_K2 is recorded can be made to be longer than that of the yellow ink. Further, an image having a value around the middle between D_K1 and D_K2 can be recorded between region A1 and region A3. Accordingly, although the relative lightness difference D_K2−D_K1 between region A1 and region A3 is great, so the change in lightness in the X direction can be made to be gradual. Consequently, an image can be obtained where change in lightness is inconspicuous regarding the black ink as well.

Next, a mechanism will be described which can make the change in lightness due to difference in discharge characteristics inconspicuous, without increasing the recording time or size of the recording device, by using the recording unit and recording method according to the present embodiment. This description will be made by referencing two comparative embodiments, and comparing the recording unit and recording method according to these comparative embodiments with the recording unit and recording method according to the present embodiment.

Figure 9:
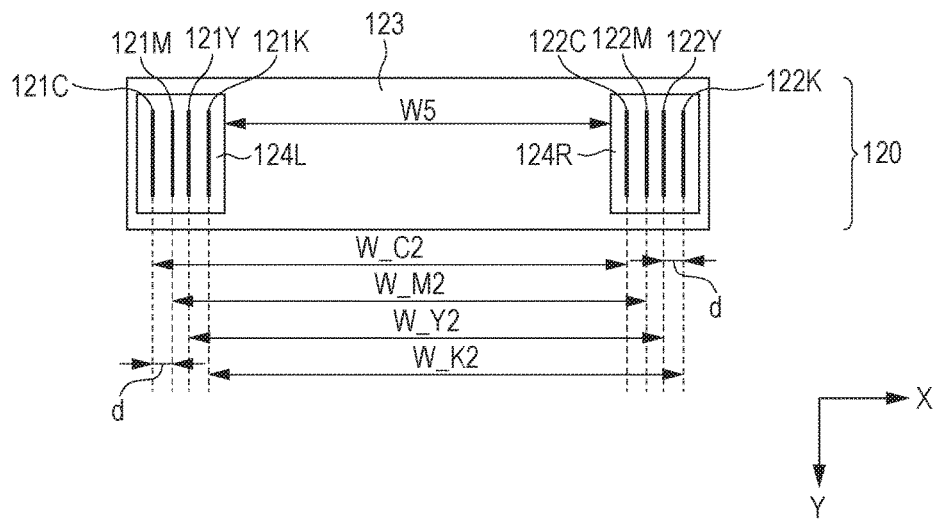
FIG. 9 is a diagram for describing a recording unit used in a comparative embodiment.

FIG. 9 is a diagram illustrating a recording unit 120 used in the first and second comparative embodiments. A recording head 124L and recording head 124R are provided within the recording unit 120 according to the first and second comparative embodiments, separated from each other by the distance W5 in the X direction, in the same way as in the recording unit 101 illustrated in FIG. 6A. The recording heads 124L and 124R are held by a single holding part 123.

The recording head 124L according to the first comparative embodiment has four discharge orifice rows 121C, 121M, 121Y, and 121K, in the order of discharge orifice row 121C that discharges cyan ink, discharge orifice row 121M that discharges magenta ink, discharge orifice row 121Y that discharges yellow ink, and discharge orifice row 121K that discharges black ink, from the left side in the X direction. On the other hand, the recording head 124R has four discharge orifice rows 122C, 122M, 122Y, and 122K, in the order of discharge orifice row 122C that discharges cyan ink, discharge orifice row 122M that discharges magenta ink, discharge orifice row 122Y that discharges yellow ink, and discharge orifice row 122K that discharges black ink, from the left side in the X direction. The discharge orifice rows in the recording heads 124L and 124R are laid out separated from each other by a same distance d in the X direction, the same as in the present embodiment.

Next, the distance in the X direction between the two discharge orifice rows that discharge ink of each color according to the first and second comparative embodiments will be described in the same way as with the present embodiment. First, with regard to the cyan ink, the discharge orifice row 121C is situated the fourth from the right side in the X direction within the recording head 124L, and the discharge orifice row 122C is situated the first from the left side in the X direction within the recording head 124R. Accordingly, distance W_C2 in the X direction between the discharge orifice row 121C and discharge orifice row 122C is a distance that can be calculated by Expression (2-1).

$$W\_C2=W5+3\times d+0\times d=W5+3d \qquad \text{Expression (2-1)}$$

Now, the term "3×d" in Expression (2-1) is a term corresponding to the fact that there are three discharge orifice rows to the right of the discharge orifice row 121C in the X direction within the recording head 124L. The term "0×d" in Expression (2-1) is a term corresponding to the fact that there are no discharge orifice rows to the left of the discharge orifice row 122C in the X direction within the recording head 124R.

Similarly, with regard to the magenta ink, the discharge orifice row 121M is situated the third from the right side in the X direction within the recording head 124L, and the discharge orifice row 122M is situated the second from the left side in the X direction within the recording head 124R. Accordingly, distance W_M2 in the X direction between the discharge orifice row 121M and discharge orifice row 122M is a distance that can be calculated by Expression (2-2).

$$W\_M2=W5+2\times d+1\times d=W5+3d \qquad \text{Expression (2-2)}$$

Also, with regard to the yellow ink, the discharge orifice row 121Y is situated the second from the right side in the X direction within the recording head 124L, and the discharge orifice row 122Y is situated the third from the left side in the X direction within the recording head 124R. Accordingly, distance W_Y2 in the X direction between the discharge orifice row 121Y and discharge orifice row 122Y is a distance that can be calculated by Expression (2-3).

$$W\_Y2=W5+1\times d+2\times d=W5+3d \qquad \text{Expression (2-3)}$$

Further, with regard to the black ink, the discharge orifice row 121K is situated the first from the right side in the X direction within the recording head 124L, and the discharge orifice row 122K is situated the fourth from the left side in the X direction within the recording head 124R. Accordingly, distance W_K2 in the X direction between the discharge orifice row 121K and discharge orifice row 122K is a distance that can be calculated by Expression (2-4).

$$W\_K2=W5+0\times d+3\times d=W5+3d \qquad \text{Expression (2-4)}$$

It can thus be seen from Expressions (2-1), (2-2), (2-3), and (2-4), that in the recording unit 120 used in the first and second comparative embodiments illustrated in FIG. 9, the discharge orifice rows are arranged such the distance W_C2 between the discharge orifice rows 121C and 122C that discharge cyan ink, the distance W_M2 between the discharge orifice rows 121M and 122M that discharge magenta ink, the distance W_Y2 between the discharge orifice rows 121Y and 122Y that discharge yellow ink, and the distance W_K2 between the discharge orifice rows 121K and 122K that discharge black ink, are equal to each other (W5+3d).

1. First Comparative Example

Figure 10:
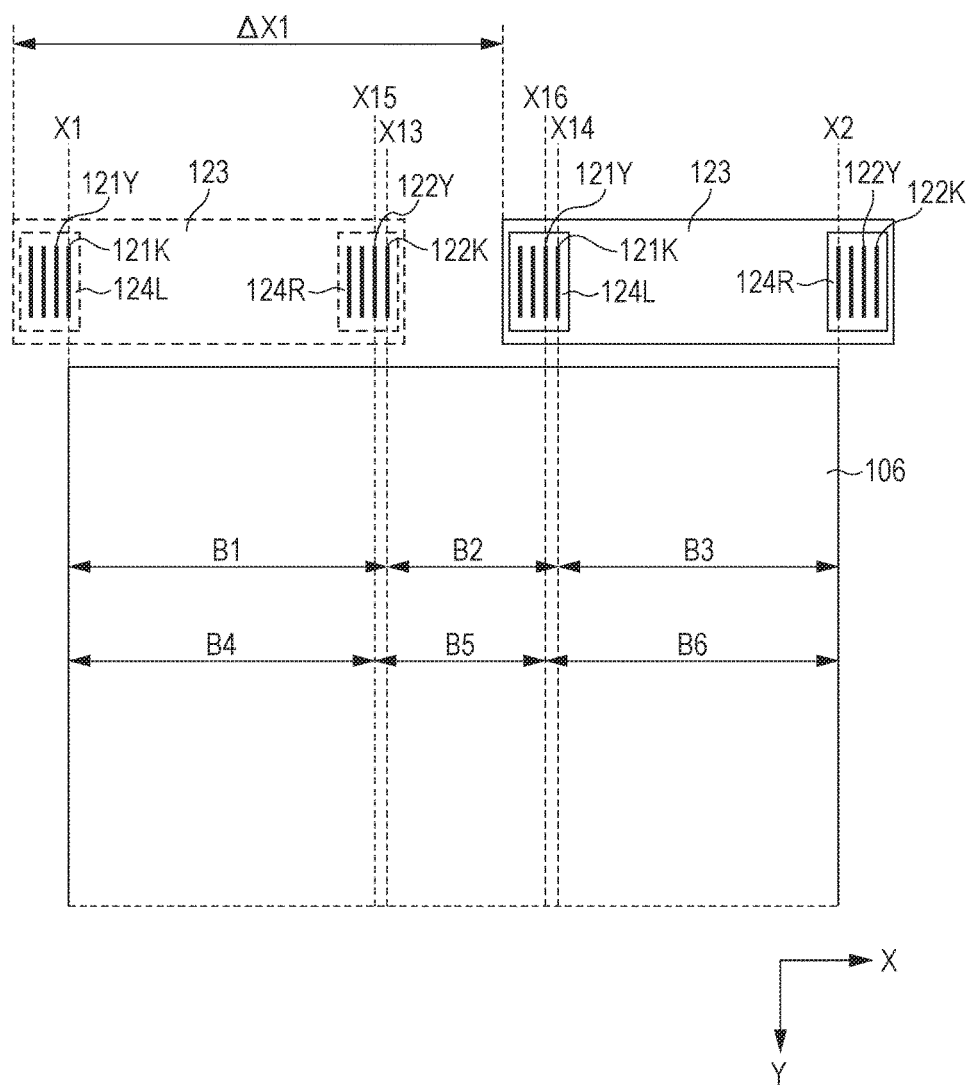
FIG. 10 is a diagram for describing a recording system according to a comparative embodiment.

FIG. 10 is a diagram for describing the way in which recording is performed on the recording medium 106 using the recording unit 120 according to the first comparative embodiment. Of the two recording units 120 illustrated in FIG. 9, the recording unit 120 situated at the left side in the X direction and drawn using dashed lines schematically illustrates the scan start position of the recording unit 120 when scanning the recording unit 120 from the left side toward the right side, while the recording unit 120 situated at the right side in the X direction and drawn using solid lines schematically illustrates the scan end position of the recording unit 120. In order to simplify description, just the four discharge orifice rows of the discharge orifice rows 121K and 122K that discharge black ink, having the lowest lightness, and the discharge orifice rows 121Y and 122Y that discharge yellow ink, having the highest lightness, will be described.

The recording unit 120 according to the first comparative embodiment is scanned over a range from where the discharge orifice row situated at the right edge portion of the recording head 124L in the X direction is at a position facing an edge position X1 at the left edge of the recording medium 106 in the X direction, to where the discharge orifice row situated at the left edge portion of the recording head 124R in the X direction is at a position facing an edge position X2 at the right edge of the recording medium 106 in the X direction. The recording unit 101 can be scanned over this range by the recording unit 101 being moved by a distance ΔX1, in the same way as the present embodiment illustrated in FIG. 7.

Hereinafter, a position on the recording medium in the X direction that the discharge orifice row 122K within the recording head 124R faces at the scan start position of the recording unit 120 will be defined as position X13, and a position on the recording medium in the X direction that the discharge orifice row 122Y within the recording head 124R faces will be defined as position X15. Also, a position on the recording medium in the X direction that the discharge orifice row 121K within the recording head 124L faces at the scan end position of the recording unit 120 will be defined as position X14, and a position on the recording medium in the X direction that the discharge orifice row 121Y within the recording head 124L faces will be defined as position X16.

It can be seen from FIG. 10 that, in a case of scanning the recording unit 120 for the distance ΔX1, the discharge orifice row 122K for black ink in the recording head 124R cannot face a region on the recording medium 106 to the left side of the position X13 in the X direction. Accordingly, black ink can only be discharged from the discharge orifice row 121K in the recording head 124L to the region B1 on the recording medium 106 from the edge position X1 to the position X13. It can similarly be seen that the discharge orifice row 121K for black ink in the recording head 124L cannot face a region on the recording medium 106 to the right side of the position X14 in the X direction. Accordingly, black ink can only be discharged from the discharge orifice row 122K in the recording head 124R to the region B3 on the recording medium 106 from the position X14 to the edge position X2. The region B2 on the recording medium 106 from positions X13 to X14 can be faced by both the discharge orifice row 121K in the recording head 124L and the discharge orifice row 122K in the recording head 124R while scanning the recording unit 120 over the distance ΔX1.

In the first comparative example, black ink is not discharged from the discharge orifice row 122K as to the region B1 on the recording medium 106; black ink is discharged to the region B1 only from the discharge orifice row 121K. Also, black ink is not discharged from the discharge orifice row 121K as to the region B3 on the recording medium 106; black ink is discharged to the region B3 only from the discharge orifice row 122K. Further, ink is discharged to the region B2 on the recording medium 106 from both the discharge orifice row 121K and the discharge orifice row 122K.

On the other hand, in a case of scanning the recording unit 120 for the distance ΔX1, the discharge orifice row 122Y for yellow ink in the recording head 124R cannot face a region on the recording medium 106 to the left side of the position X15 in the X direction. Accordingly, yellow ink can only be discharged from the discharge orifice row 121Y in the recording head 124L to the region B4 on the recording medium 106 from the edge position X1 to the position X15. It can similarly be seen that the discharge orifice row 121Y for yellow ink in the recording head 124L cannot face a region on the recording medium 106 to the right side of the position X16 in the X direction while scanning the distance ΔX1. Accordingly, yellow ink can only be discharged from the discharge orifice row 122Y in the recording head 124R to the region B6 on the recording medium 106 from the position X16 to the edge position X2.

The region B5 on the recording medium 106 from positions X15 to X16 can be faced by both the discharge orifice row 121Y in the recording head 124L and the discharge orifice row 122Y in the recording head 124R while scanning the recording unit 120 over the distance ΔX1. Accordingly, in the first comparative embodiment, yellow ink is not discharged from the discharge orifice row 122Y as to the region B4 on the recording medium 106; ink is discharged to the region B4 only from the discharge orifice row 121Y. Also, yellow ink is not discharged from the discharge orifice row 121Y as to the region B6 on the recording medium 106; ink is discharged to the region B6 only from the discharge orifice row 122Y. Further, ink is discharged to the region B5 on the recording medium 106 from both the discharge orifice row 121Y and the discharge orifice row 122Y.

Comparing the first comparative embodiment with the present embodiment, the scan end position is no different between the recording unit 120 and the recording unit 101, and the order of array of discharge orifice rows within the recording head 124L is no different from that in the recording head 102L. Accordingly, the position X14 is actually the same position as the position X4, and the position X16 as the position X6.

On the other hand, while the scan start position is no different between the recording unit 120 and the recording unit 101, the order of array of discharge orifice rows within the recording head 124L is different from that in the recording head 102L. Specifically, while the discharge orifice row 122K is situated the first from the right side in the X direction out of the four discharge orifice rows within the recording head 124R, and the discharge orifice row 122Y is situated the second from the right side in the X direction, the discharge orifice row 112K is situated the fourth from the right side in the X direction out of the four discharge orifice rows within the recording head 102R, and the discharge orifice row 112Y is situated the first from the right side in the X direction. Thus, it can be seen that position X13 is situated further to the right in the X direction than position X3, and position X15 is situated further to the left in the X direction than position X5.

Accordingly, it can be seen that the region B2 from position X13 to position X14 in the first comparative example is narrower in width than the region A2 from position X3 to position X4 in the present embodiment. In the same way, it can be seen that the region B5 from position X15 to position X16 in the first comparative example is broader in width than the region A5 from the position X5 to position X6 in the present embodiment.

According to the first comparative embodiment, the recording unit only needs to be scanned by the distance ΔX1 to record the entire region of the recording medium 106 in the X direction, so increase in the recording time and size of the recording device can be suppressed, the same as in the present embodiment. However, the present embodiment is further capable if suitably suppressing change in lightness in the X direction of black ink that has low lightness, as compared to the first comparative embodiment.

Figure 11:
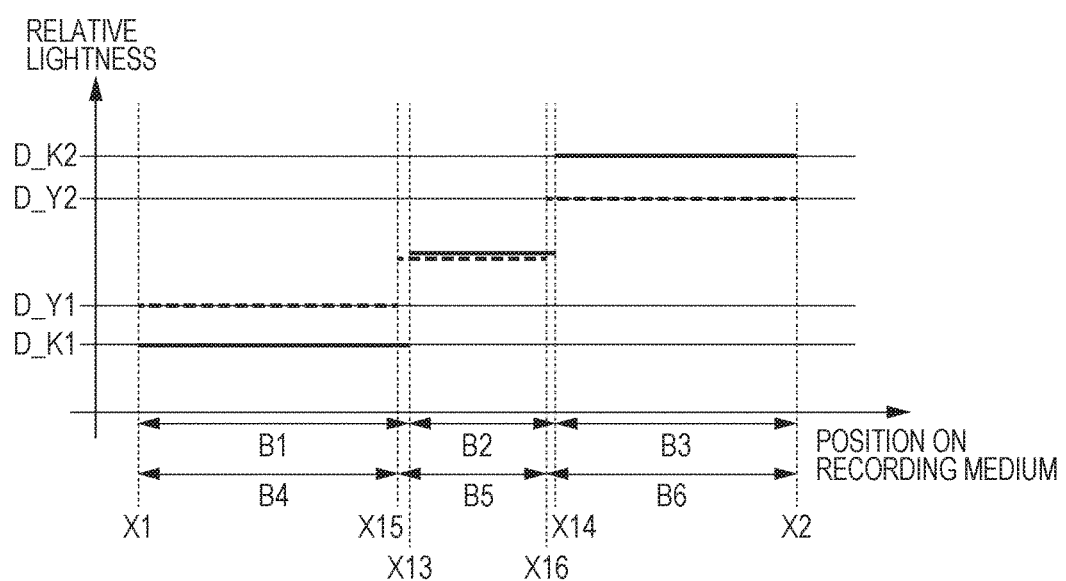
FIG. 11 is a diagram schematically illustrating change in lightness in a case of applying a comparative embodiment.

FIG. 11 is a diagram for describing change in lightness in a case where difference in discharge characteristics has occurred at one of the recording head 124L and recording head 124R, and that the amount of discharge from discharge orifice rows in the recording head 124L has become greater than the amount of discharge from discharge orifice rows in the recording head 124R. A case is illustrated here where the degree of difference in discharge characteristics occurring among the discharge orifice rows is around the same for each color. The horizontal axis represents the position on the recording medium and the vertical axis represents the relative lightness of images recorded by each of black ink and yellow ink. In the first comparative embodiment, the aforementioned relative lightness of an image is obtained by recording the entire region in the X direction by ink of a single color, calculating the difference in lightness between the image of ink of one color and the recording medium in each region, and obtaining the ratio in difference in lightness at each position as to an average of the difference in lightness.

FIG. 11 illustrates the relative lightness of images recorded by black ink using solid lines, and the relative lightness of images recorded by yellow ink using dashed lines. FIG. 11 also assumes a case where the generated recording data is such that the amount of discharge for both black ink and yellow ink would be the same regardless the position on the recording medium in the X direction, had there been no difference in discharge characteristics. Although the average in difference in lightness for the black ink and the average in difference in lightness for the yellow ink actually are different, FIG. 11 illustrates the relative lightness shifted in the lightness direction so that the average in difference in lightness for the black ink and the average in difference in lightness for the yellow ink agree, for the sake of simplifying description.

It can be seen from the comparison between change in lightness in the first comparative embodiment illustrated in FIG. 11 and change in lightness in the present embodiment illustrated in FIG. 8 that the relative lightness of the images recorded in the regions B1 through B6 is no different from the relative lightness of the images recorded in the regions A1 through A6. However, the change in lightness of black ink in regions B1 through B3 is sharper than the change in lightness of black ink in regions A1 through A3 illustrated in FIG. 8. The reason is that the region B2 where shared recording is performed by the discharge orifice row 121K and discharge orifice row 122K according to the first comparative embodiment is narrower in width than the region A2 where shared recording is performed by the discharge orifice row 111K and discharge orifice row 112K according to the present embodiment, as described above.

Specifically, in the first comparative embodiment, the distance between region B3 where an image is recorded in the low relative lightness D_K1 and B3 where an image is recorded in the high relative lightness D_K2 in the first comparative embodiment is shorter than the distance between region A1 and region A3 in the present embodiment, and also, the width of the region B2 in the X direction where an image is recorded having relative lightness around the middle between D_K1 and D_K2 is shorter than the region A2. On the other hand, the relative lightness differences D_K1 and D_K2 are no different from those in the present embodiment. As a result, the change in lightness from regions B1 to B3 in the first comparative embodiment is sharper than the change in lightness from regions A1 to A3 in the present embodiment, and may be conspicuous.

As described above, change in lightness in the X direction of black ink of which the lightness is low can be made more gradual in the present embodiment, as compared to the first comparative embodiment. Consequently, this change in lightness can be made to be inconspicuous.

2. Second Comparative Embodiment

Figure 12:
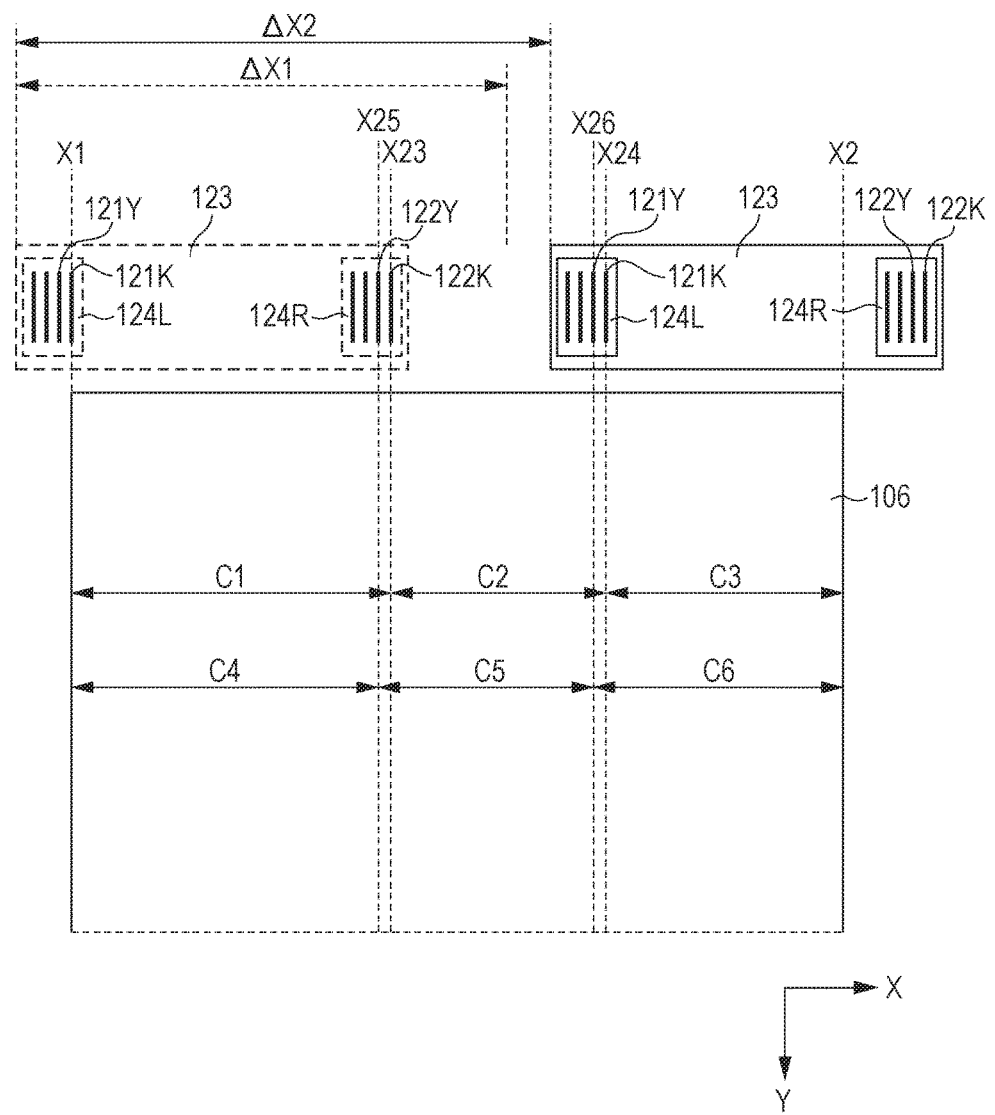
FIG. 12 is a diagram for describing a recording system according to a comparative embodiment.

FIG. 12 is a diagram for describing the way in which recording is performed on the recording medium 106 using the recording unit 120 according to the second comparative embodiment. Of the two recording units 120 illustrated in FIG. 9, the recording unit 120 situated at the left side in the X direction and drawn using dashed lines schematically illustrates the scan start position of the recording unit 120 when scanning the recording unit 120 from the left side toward the right side, while the recording unit 120 situated at the right side in the X direction and drawn using solid lines schematically illustrates the scan end position of the recording unit 120.

The recording unit 120 according to the second comparative embodiment performs recording in which the recording unit 120 is scanned by a distance ΔX2 that is longer than the distance ΔX1 in the present embodiment and first comparative embodiment. This distance ΔX2 is equivalent to the scanning distance of the recording unit 120 necessary to make the width in a region C2 where shared recording is performed by the discharge orifice row 121K and discharge orifice row 122K the same length as the width of the region A2 where the discharge orifice row 111K and discharge orifice row 112K perform shared recording. This point will be described later in detail.

Hereinafter, a position on the recording medium in the X direction that the discharge orifice row 122K within the recording head 124R faces at the scan start position of the recording unit 120 will be defined as position X23, and a position on the recording medium in the X direction that the discharge orifice row 122Y within the recording head 124R faces will be defined as position X25. Further, a position on the recording medium in the X direction that the discharge orifice row 121K within the recording head 124L faces at the scan end position of the recording unit 120 will be defined as position X24, and a position on the recording medium in the X direction that the discharge orifice row 121Y within the recording head 124L faces will be defined as position X26.

It can be seen from FIG. 12 that, in a case of scanning the recording unit 120 for the distance ΔX2, the discharge orifice row 122K for black ink in the recording head 124R cannot face a region on the recording medium 106 to the left side of the position X23 in the X direction. Accordingly, black ink can only be discharged from the discharge orifice row 121K in the recording head 124L to region C1 on the recording medium 106 from the edge position X1 to the position X23. It can similarly be seen that the discharge orifice row 121K for black ink in the recording head 124L cannot face a region on the recording medium 106 to the right side of the position X24 in the X direction. Accordingly, black ink can only be discharged from the discharge orifice row 122K in the recording head 124R to region C3 on the recording medium 106 from the position X24 to the edge position X2. Region C2 on the recording medium 106 from positions X23 to X24 can be faced by both the discharge orifice row 121K in the recording head 124L and the discharge orifice row 122K in the recording head 124R while scanning the recording unit 120 over the distance ΔX2.

In the second comparative example, black ink is not discharged from the discharge orifice row 122K as to the region C1 on the recording medium 106; ink is discharged to the region C1 only from the discharge orifice row 121K. Also, black ink is not discharged from the discharge orifice row 121K as to the region C3 on the recording medium 106; ink is discharged to the region C3 only from the discharge orifice row 122K. Further, ink is discharged to the region C2 on the recording medium 106 from both the discharge orifice row 121K and the discharge orifice row 122K.

On the other hand, in a case of scanning the recording unit 120 for the distance ΔX2, the discharge orifice row 122Y for yellow ink in the recording head 124R cannot face a region on the recording medium 106 to the left side of the position X25 in the X direction. Accordingly, yellow ink can only be discharged from the discharge orifice row 121Y in the recording head 124L to the region C4 on the recording medium 106 from the edge position X1 to the position X25. It can similarly be seen that the discharge orifice row 121Y for yellow ink in the recording head 124L cannot face a region on the recording medium 106 to the right side of the position X26 in the X direction. Accordingly, yellow ink can only be discharged from the discharge orifice row 122Y in the recording head 124R to the region C6 on the recording medium 106 from the position X26 to the edge position X2 while scanning the distance ΔX2.

The region C5 on the recording medium 106 from positions X25 to X26 can be faced by both the discharge orifice row 121Y in the recording head 124L and the discharge orifice row 122Y in the recording head 124R while scanning the recording unit 120 over the distance ΔX2. Accordingly, in the second comparative embodiment, yellow ink is not discharged from the discharge orifice row 122Y as to the region C4 on the recording medium 106; ink is discharged to the region C4 only from the discharge orifice row 121Y. Also, yellow ink is not discharged from the discharge orifice row 121Y as to the region C6 on the recording medium 106; ink is discharged to the region C6 only from the discharge orifice row 122Y. Further, ink is discharged to the region C5 on the recording medium 106 from both the discharge orifice row 121Y and the discharge orifice row 122Y.

As described above, the recording unit 120 according to the second comparative embodiment performs recording in which the recording unit 120 is scanned by a distance ΔX2 that is longer than the distance ΔX1 in the present embodiment and first comparative embodiment, so that the width in the region C2 where shared recording is performed by the discharge orifice row 121K and discharge orifice row 122K is the same length as the width of the region A2 where the discharge orifice row 111K and discharge orifice row 112K perform shared recording. Accordingly, the width in the X direction of the region C2 and region C5 in the second comparative embodiment is longer than the width in the X direction of the region B2 and region B5 in the first comparative embodiment, and the width in the X direction of the region C3 and region C6 is shorter than the width in the X direction of the region B3 and region B6. Change in lightness in the X direction of black ink of which lightness is low can be made to be inconspicuous in the second comparative embodiment, the same as in the present embodiment.

Figure 13:
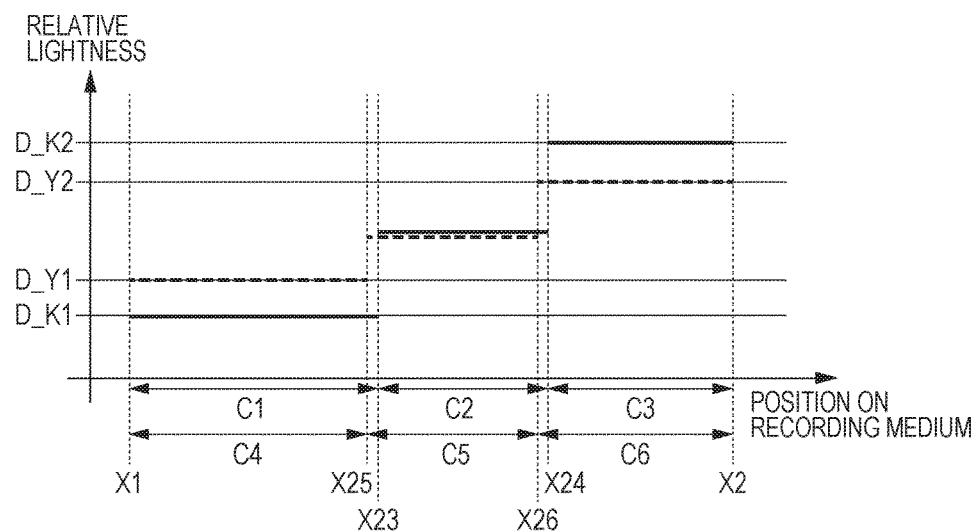
FIG. 13 is a diagram schematically illustrating change in lightness in a case of applying a comparative embodiment.

FIG. 13 is a diagram for describing change in lightness in a case where difference in discharge characteristics has occurred at one of the recording head 124L and recording head 124R, and that the amount of discharge from discharge orifice rows in the recording head 124L has become greater than the amount of discharge from discharge orifice rows in the recording head 124R. A case is illustrated here where the degree of difference in discharge characteristics occurring among the discharge orifice rows is around the same for each color. The horizontal axis represents the position on the recording medium and the vertical axis represents the relative lightness of images recorded by each of black ink and yellow ink. In the second comparative embodiment, the aforementioned relative lightness of an image is obtained by recording the entire region in the X direction by ink of a single color, calculating the difference in lightness between the image of ink of one color and the recording medium in each region, and obtaining the ratio in difference in lightness at each position as to an average of the difference in lightness.

FIG. 13 illustrates the relative lightness of images recorded by black ink using solid lines, and the relative lightness of images recorded by yellow ink using dashed lines. FIG. 13 also assumes a case where the generated recording data is such that the amount of discharge for both black ink and yellow ink would be the same regardless the position on the recording medium in the X direction, had there been no difference in discharge characteristics. Although the average in difference in lightness for the black ink and the average in difference in lightness for the yellow ink actually are different, FIG. 13 illustrates the relative lightness shifted in the lightness direction so that the average in difference in lightness for the black ink and the average in difference in lightness for the yellow ink agree, for the sake of simplifying description.

As described above, the width of the region C2 in the X direction according to the second comparative embodiment has the same width as the region A2 in the X direction according to the present embodiment. Accordingly, comparing the change in lightness of black ink in the second comparative embodiment illustrated in FIG. 13 with the change in lightness of black ink in the present embodiment illustrated in FIG. 8 shows that although the region where change in light ness occurs is shifted to the right in the X direction in the second comparative embodiment as compared to the present embodiment, the degree of change in lightness (the degree of steepness) is no different from that of the present embodiment. Accordingly, the change in lightness in the X direction of black ink of which lightness is low in the second comparative embodiment is gradual, and thus is inconspicuous.

However, the scanning distance of the recording unit 120 in the second comparative embodiment is ΔX2, which is longer than the ΔX1 in the present embodiment, as described above. Accordingly, the amount of time till one scan ends can be made shorter with the present embodiment as compared to the second comparative embodiment, so the amount of time needed to complete recording can be reduced. Further, the width by which the right side of the recording unit 120 runs past the position facing the recording medium 106 at the scan end position is longer in the second comparative embodiment than in the present embodiment, which can be seen by comparing FIGS. 7 and 12. Accordingly, the movable region of the recording unit 120 in the X direction within the recording device can be made smaller in the present embodiment as compared to the second comparative embodiment, so the size of the recording device can be reduced. Thus, according to the present embodiment, change in lightness of ink with low lightness can be made inconspicuous, while suppressing increase in the recording time and size of the recording device, as described above.

Second Embodiment

An arrangement has been described in the first embodiment above, where the distance between discharge orifice rows for color ink, i.e., discharge orifice rows for cyan ink, magenta ink, and yellow ink, is the same. An arrangement will be described in a second embodiment where the distance between discharge orifice rows is changed regarding the discharge orifice rows discharging color ink as well, in accordance with the difference in lightness as to the surface of the recording medium. Description of portions that are the same as in the above-described first embodiment will be omitted.

There is difference in lightness in color ink besides black ink as well, as illustrated in FIG. 5. Specifically, of the color inks used in the present embodiment, cyan ink has the greatest lightness difference as to the recording medium, and yellow ink has the smallest lightness difference as to the recording medium. Accordingly, when considering the degree of conspicuousness in the X direction including black ink, it can be seen that this is most conspicuous in the black ink, and less conspicuous in the order of cyan ink, magenta ink, and yellow ink. In light of the above, the discharge orifice rows are arrayed within the recording heads such that the lower the lightness of the ink is, the shorter the distance between the discharge orifice rows discharging that ink is.

Figure 14:
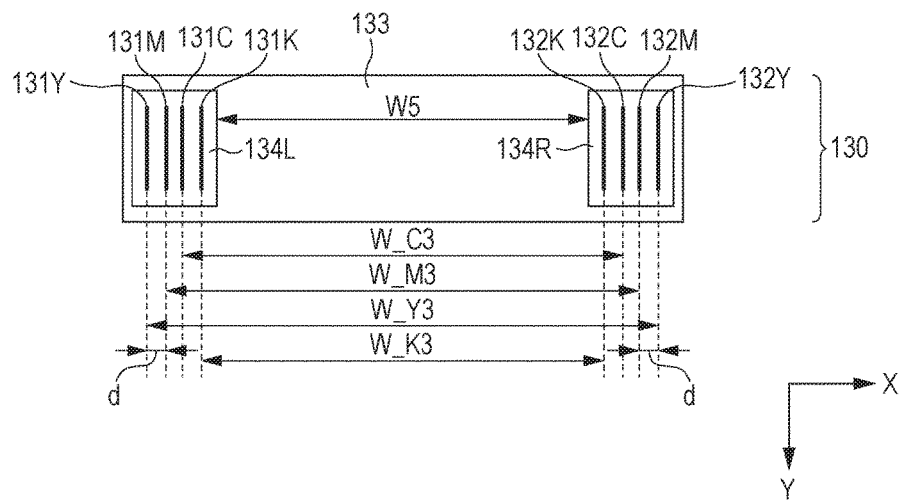
FIG. 14 is a diagram illustrating a recording unit used in an embodiment.

FIG. 14 is a diagram illustrating a recording unit 130 used in the present embodiment in detail, schematically illustrating the recording unit 130 from below in the vertical direction. The recording head 134L and the recording head 134R in the recording unit 130 according to the present embodiment are separated by a distance W5 in the X direction. The recording head 134L has four discharge orifice rows 131C, 131M, 131Y, and 131K, in the order of discharge orifice row 131K that discharges black ink, discharge orifice row 131C that discharges cyan ink, discharge orifice row 131M that discharges magenta ink, and discharge orifice row 131Y that discharges yellow ink, from the right side in the X direction. On the other hand, the recording head 134R has four discharge orifice rows 132C, 132M, 132Y, and 132K, in the order of discharge orifice row 132C that discharges cyan ink, discharge orifice row 132M that discharges magenta ink, discharge orifice row 132Y that discharges yellow ink, and discharge orifice row 132K that discharges black ink, from the right side in the X direction. The four discharge orifice rows 131C, 131M, 131Y, and 131K in the recording head 134L are laid out separated from each other by a same distance d. In the same way, the four discharge orifice rows 132C, 132M, 132Y, and 132K in the recording head 134R are laid out separated from each other by the same distance d.

Now, the distance in the X direction between the two discharge orifice rows that discharge ink of each color according to the present embodiment will be described in the same way as with the first embodiment. First, with regard to the cyan ink, the discharge orifice row 131C is situated the second from the right side in the X direction within the recording head 134L, and the discharge orifice row 132C is situated the second from the left side in the X direction within the recording head 124R. Accordingly, distance W_C3 in the X direction between the discharge orifice row 131C and discharge orifice row 132C is a distance that can be calculated by Expression (3-1).

$$W\_C3=W5+1\times d+1\times d=W5+2d \qquad \text{Expression (3-1)}$$

Next, with regard to the magenta ink, the discharge orifice row 131M is situated the third from the right side in the X direction within the recording head 134L, and the discharge orifice row 132M is situated the third from the left side in the X direction within the recording head 134R. Accordingly, distance W_M3 in the X direction between the discharge orifice row 131M and discharge orifice row 132M is a distance that can be calculated by Expression (3-2).

$$W\_M3=W5+2\times d+2\times d=W5+4d \qquad \text{Expression (3-2)}$$

Also, with regard to the yellow ink, the discharge orifice row 131Y is situated the fourth from the right side in the X direction within the recording head 134L, and the discharge orifice row 132Y is situated the fourth from the left side in the X direction within the recording head 134R. Accordingly, distance W_Y3 in the X direction between the discharge orifice row 131Y and discharge orifice row 132Y is a distance that can be calculated by Expression (3-3).

$$W\_Y3=W5+3\times d+3\times d=W5+6d \qquad \text{Expression (3-3)}$$

Further, with regard to the black ink, the discharge orifice row 131K is situated the first from the right side in the X direction within the recording head 134L, and the discharge orifice row 132K is situated the first from the left side in the X direction within the recording head 134R. Accordingly, distance W_K3 in the X direction between the discharge orifice row 131K and discharge orifice row 132K is a distance that can be calculated by Expression (3-4).

$$W\_K3=W5+0\times d+0\times d=W5 \qquad \text{Expression (3-4)}$$

It can thus be seen from Expressions (3-1), (3-2), (3-3), and (3-4), that the discharge orifice rows corresponding to ink of each color are arranged such that the distances between the discharge orifice rows corresponding to the respective colors are shorter in the order of distance W_Y3 between the discharge orifice rows 131Y and 132Y discharging yellow ink (W5+6d), distance W_M3 between the discharge orifice rows 131M and 132M discharging magenta ink (W5+4d), distance W_C3 between the discharge orifice rows 131C and 132C discharging cyan ink (W5+2d), and distance W_K3 between the discharge orifice rows 131K and 132K discharging black ink (W5). That is to say, the discharge orifice rows corresponding to the respective colors are arrayed such that the lower the lightness of the ink is, the shorter the distance between the discharge orifice rows discharging that ink is.

Figure 15:
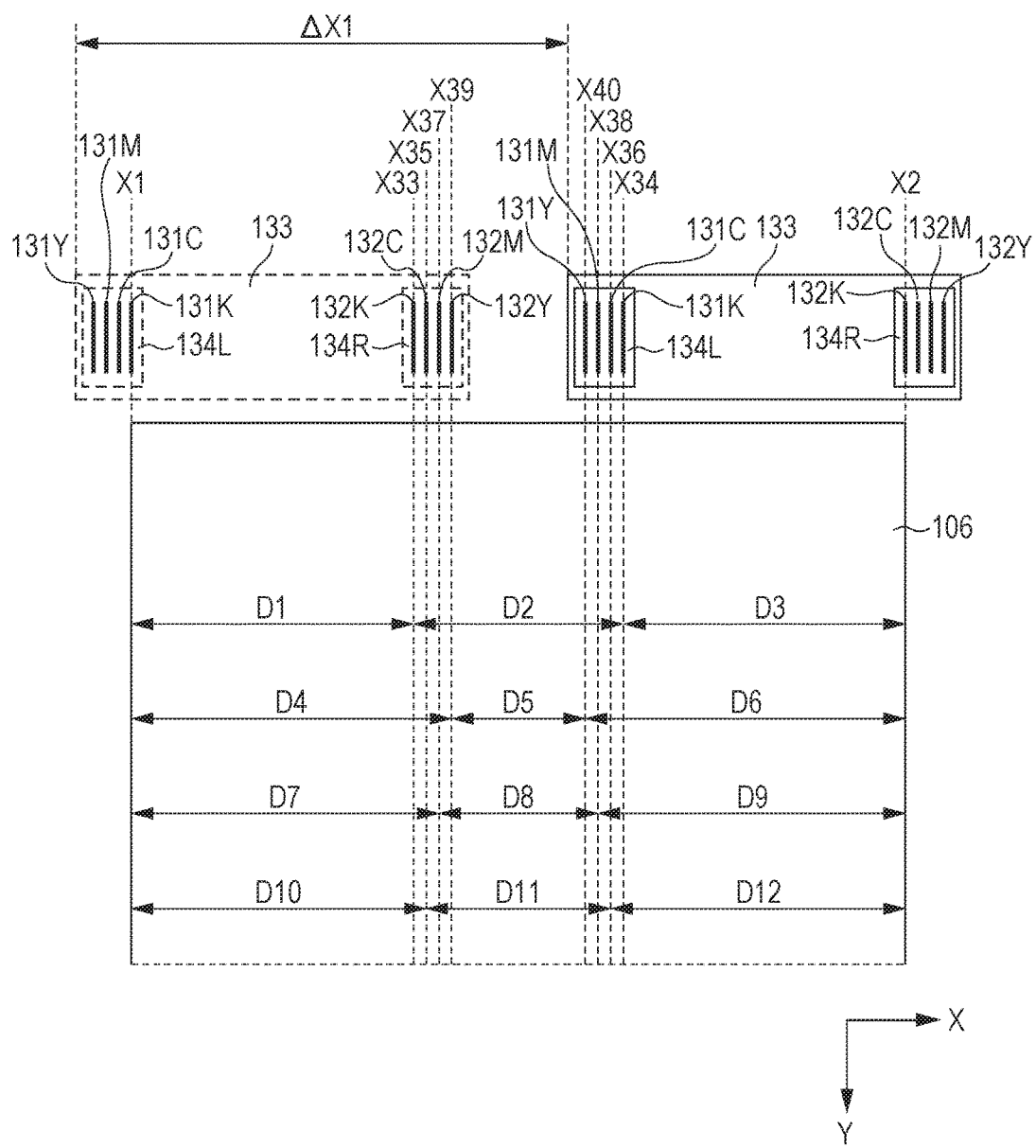
FIG. 15 is a diagram for describing a recording system according to an embodiment.

FIG. 15 is a diagram for describing the way in which recording is performed on the recording medium 106 using the recording unit 130 according to the present embodiment. Of the two recording units 130 illustrated in FIG. 15, the recording unit 130 situated at the left side in the X direction and drawn using dashed lines schematically illustrates the scan start position of the recording unit 130 when scanning the recording unit 130 from the left side toward the right side, while the recording unit 130 situated at the right side in the X direction and drawn using solid lines schematically illustrates the scan end position of the recording unit 130.

The recording unit 130 according to the present embodiment is scanned over a range from where the discharge orifice row situated at the right edge portion of the recording head 134L in the X direction is at a position facing an edge position X1, to where the discharge orifice row situated at the left edge portion of the recording head 134R in the X direction is at a position facing an edge position X2, in the same way as in the first embodiment. The recording unit 130 according to the present embodiment is scanned by a distance ΔX1, in the same way as in the first embodiment.

Hereinafter, positions on the recording medium in the X direction that the discharge orifice row 132K, the discharge orifice row 132C, the discharge orifice row 132M, and the discharge orifice row 132Y, within the recording head 134R face at the scan start position of the recording unit 130 will be defined as position X33, position X35, position X37, and position X39, respectively. Also, positions on the recording medium in the X direction that the discharge orifice row 131K, the discharge orifice row 131C, the discharge orifice row 131M, and the discharge orifice row 131Y, within the recording head 134L face at the scan end position of the recording unit 130 will be defined as position X34, position X36, position X38, and position X40, respectively.

In the same way as with the first embodiment, black ink is not discharged from the discharge orifice row 132K as to the region D1 on the recording medium 106 from the edge position X1 to position X33; ink is discharged to the region D1 only from the discharge orifice row 131K. Also, black ink is not discharged from the discharge orifice row 131K as to the region D3 on the recording medium 106 from the position X34 to the edge position X2; ink is discharged to the region D3 only from the discharge orifice row 132K. Further, black ink is discharged from both the discharge orifice row 131K and discharge orifice row 132K to the region D2 on the recording medium from position X33 to X34.

Next, regarding yellow ink, yellow ink is not discharged from the discharge orifice row 132Y as to the region D4 on the recording medium 106 from the edge position X1 to position X39; ink is discharged to the region D4 only from the discharge orifice row 131Y. Also, yellow ink is not discharged from the discharge orifice row 131Y as to the region D6 on the recording medium 106 from the position X40 to the edge position X2; ink is discharged to the region D6 only from the discharge orifice row 132Y. Further, yellow ink is discharged from both the discharge orifice row 131Y and discharge orifice row 132Y to the region D5 on the recording medium from position X39 to X40.

Next, regarding magenta ink, magenta ink is not discharged from the discharge orifice row 132M as to the region D7 on the recording medium 106 from the edge position X1 to position X37; ink is discharged to the region D7 only from the discharge orifice row 131M. Also, magenta ink is not discharged from the discharge orifice row 131M as to the region D9 on the recording medium 106 from the position X38 to the edge position X2; ink is discharged to the region D9 only from the discharge orifice row 132M. Further, magenta ink is discharged from both the discharge orifice row 131M and discharge orifice row 132M to the region D8 on the recording medium from position X37 to X38.

Next, regarding cyan ink, cyan ink is not discharged from the discharge orifice row 132C as to the region D10 on the recording medium 106 from the edge position X1 to position X35; ink is discharged to the region D10 only from the discharge orifice row 131C. Also, cyan ink is not discharged from the discharge orifice row 131C as to the region D12 on the recording medium 106 from the position X36 to the edge position X2; ink is discharged to the region D12 only from the discharge orifice row 132C. Further, cyan ink is discharged from both the discharge orifice row 131C and discharge orifice row 132C to the region D11 on the recording medium from position X35 to X36.

Thinking in the same was as with the first embodiment, the widths of the regions where shared recording is performed by two discharge orifice rows in cases in the order of region D5 for yellow ink, region D8 for magenta ink, region D11 for cyan ink, and region D2 for black ink. That is to say, the lower the lightness is, the longer the width is in the X direction of the region where shared recording is performed. Thus, change in lightness, which is more conspicuous the lower the lightness of the ink is, can be suitably suppressed for each ink.

Third Embodiment

An arrangement has been described in the above first and second embodiments where, regardless of the position in the region A2 in the X direction, quantization data is distributed to the two discharge orifice rows in the left-right head distribution processing, such that the distribution ratio of quantization data to the discharge orifice row within the recording head at the left side and the distribution ratio of quantization data to the discharge orifice row within the recording head at the right side in the recording unit are equal. As opposed to this, an arrangement will be described in a third embodiment where quantization data is distributed to the two discharge orifice rows such that the distribution ratio of quantization data to the discharge orifice row within the recording head at the left side and the distribution ratio of quantization data to the discharge orifice row within the recording head at the right side differ, in accordance with the position in the region A2 in the X direction. Description of portions that are the same as in the above-described first and second embodiments will be omitted.

In a case of using the distribution patterns illustrated in FIGS. 4A and 4B, the change in lightness is gradual when viewed over the entire region of the recording medium in the X direction as illustrated in FIG. 8, but the change in lightness may be steep locally, such as at the boundary between region A1 and region A2, between region A2 and region A3, and so forth, which are adjacent to each other.

Although black ink is discharged to region A1 using the discharge orifice row 111K alone (distribution ratio to the discharge orifice row 111K is 100%), but at the instant of switching from region A1 to region A2 in the distribution patterns illustrated in FIGS. 4A and 4B, the distribution ratio to the discharge orifice row 111K is 50%. Further, the distribution ratio to the discharge orifice row 111K in region A2 is constantly 50%, and at the instant of switching from region A2 to region A3, no black ink is discharged from the discharge orifice row 111K (distribution ratio to the discharge orifice row 111K is 0%).

Conversely, the distribution patterns used for left-right recording head distribution processing in step S804 in the present embodiment is different from that in the first embodiment. Accordingly, occurrence of locally steep change in lightness due to discharge properties among discharge orifice rows can be suppressed, in addition to the advantages of the first embodiment.

Figure 16A:
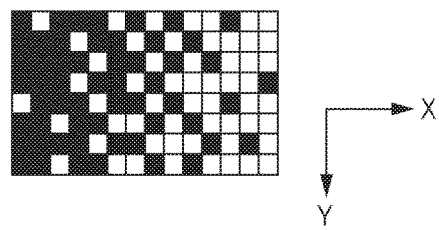
FIGS. 16A and 16B are diagrams illustrating distribution patterns according to an embodiment.
Figure 16B:
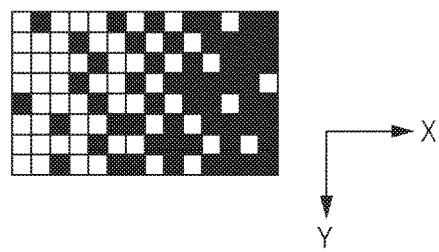

FIGS. 16A and 16B are schematic diagrams illustrating an example of distribution patterns used in the left-right head distribution in step S804 in the present embodiment. FIG. 16A corresponds to a certain color, and is a diagram schematically illustrating a distribution pattern for distributing quantization data corresponding to an image at the middle region of the recording medium in the X direction, where shared recording is performed by two discharge orifice rows provided to the recording heads 102L and 102R, to the discharge orifice row provided to the recording head 102L. FIG. 16B is a diagram schematically illustrating a distribution pattern for distributing this quantization data to the discharge orifice row provided to the recording head 102R. Note that these distribution patterns are stored in the ROM 313 beforehand.

In the same way as in the first embodiment, description will be made assuming that the region at the middle in the X direction where shared recording is performed is a region that has a size of 14 pixels in the X direction, for the sake of simplicity. For example, in a case of considering distribution processing at discharge orifice rows 111K and 112K discharging black ink, description will be made assuming that the width of the region A2 in the X direction in FIG. 7 has a width of 14 pixels. Note however, that the width of the region A2 in the X direction is not restricted to a size of 14 pixels, and any distribution patterns may be used as long as later-described conditions are satisfied. This is the same for discharge orifice row for other color inks, such as the discharge orifice rows 111Y and 112Y that discharge yellow ink for example, and advantages of the present embodiment can be yielded as long as the distribution patterns satisfy later-described conditions.

The distribution patterns illustrated in FIGS. 16A and 16B are configured with an 8-pixel size in the Y direction as a repetition unit, and the left-right head distribution processing is completed as to the entirety of the region where shared recording is to be performed, by repeatedly using these distribution patterns in the Y direction. In the distribution patterns illustrated in FIGS. 16A and 16B, the black pixels indicate pixels regarding which discharging of ink is permitted in a case where ink discharge is set by the quantization data. On the other hand, the white pixels indicate pixels regarding which discharging of ink is not permitted, even in a case where ink discharge is set by the quantization data.

It can be seen from FIGS. 16A and 16B that the distribution pattern corresponding to the discharge orifice row provided to the recording head 102L used in the present embodiment, and the distribution pattern corresponding to the discharge orifice row provided to the recording head 102R have ink discharge permitted at mutually exclusive and complementary positions. Accordingly, left-right head distribution processing can be performed so that in a case where quantization data instructing discharge of ink to all pixels is acquired as the quantization data corresponding to the region where shared recording is to be performed, for example, ink is discharged just once, from either one or the other of a discharge orifice row in the recording head 102L and a discharge orifice row in the recording head 102R, at all pixels within this region, the same as in the first embodiment.

Further, it can be seen from FIGS. 16A and 16B that the discharge pattern corresponding to the discharge orifice row in the recording head 102L and the discharge pattern corresponding to the discharge orifice row in the recording head 102R, used in the present embodiment, have a different number of pixels regarding which discharge of ink is permitted, in accordance with the position in the X direction on the recording medium. Specifically, in the distribution pattern corresponding to the discharge orifice row in the recording head 102L illustrated in FIG. 16A, permission/non-permission is set such that of the number of pixels regarding which discharge of ink is permitted gradationally decreases from the left side in the X direction toward the right side. On the other hand, in the distribution pattern corresponding to the discharge orifice row in the recording head 102R illustrated in FIG. 16B, permission/non-permission is set such that of the number of pixels regarding which discharge of ink is permitted gradationally increases from the left side in the X direction toward the right side.

By using the distribution patterns illustrated in FIGS. 16A and 16B, the distribution ratio of quantization data to the discharge orifice row in the recording head 102L gradationally decreases in the region where shared recording is performed, from the left side in the X direction in that region toward the right side, from 100% to 0%. Also, the distribution ratio of quantization data to the discharge orifice row in the recording head 102R gradationally increases from 0% to 100%. Even in a region where shared recording is performed, the total of the distribution ratio of the recording head 102L and the distribution ratio of the recording head 102R is always 100% at any position in the X direction.

Figure 17:
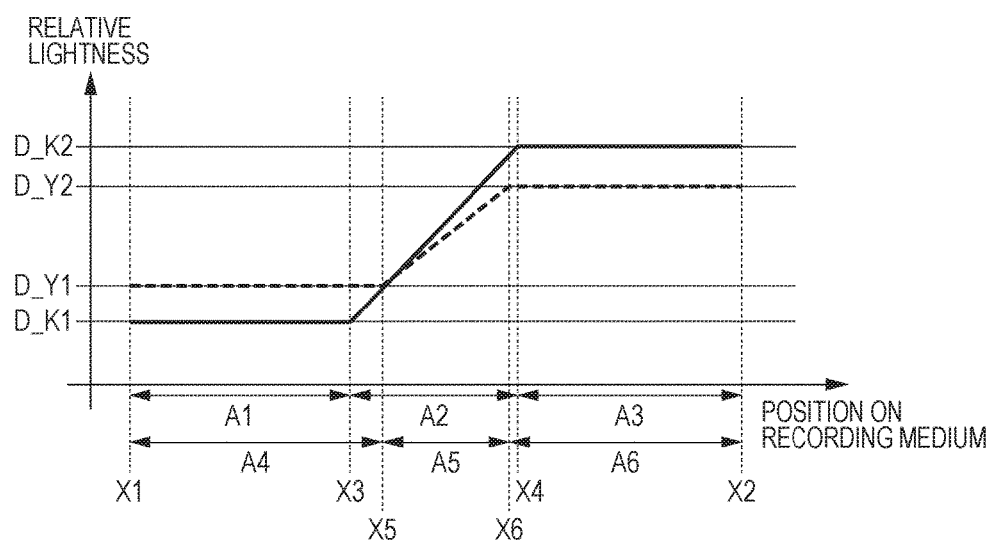
FIG. 17 is a diagram schematically illustrating change in lightness when applying an embodiment.

FIG. 17 is a diagram for describing change in lightness in a case where difference in discharge characteristics has occurred at one of the recording head 102L and recording head 102R, and that the amount of discharge from discharge orifice rows in the recording head 102L has become greater than the amount of discharge from discharge orifice rows in the recording head 102R, when using the distribution patterns illustrated in FIGS. 16A and 16B. A case is illustrated here where the degree of difference in discharge characteristics occurring among the discharge orifice rows is around the same for each color. The horizontal axis represents the position on the recording medium and the vertical axis represents the relative lightness of images recorded by each of black ink and yellow ink. Here, the aforementioned relative lightness of an image is obtained by recording the entire region in the X direction by ink of a single color, calculating the difference in lightness between the image of ink of one color and the recording medium in each region, and obtaining the ratio in difference in lightness at each position as to an average of the difference in lightness.

FIG. 17 illustrates the relative lightness of images recorded by black ink using solid lines, and the relative lightness of images recorded by yellow ink using dashed lines. FIG. 17 also assumes a case where the generated recording data is such that the amount of discharge for both black ink and yellow ink would be the same regardless the position on the recording medium in the X direction, had there been no difference in discharge characteristics. Although the average in difference in lightness for the black ink and the average in difference in lightness for the yellow ink actually are different, FIG. 17 illustrates the relative lightness shifted in the lightness direction so that the average in difference in lightness for the black ink and the average in difference in lightness for the yellow ink agree, for the sake of simplifying description.

The relative lightness of the image recorded in the region A1 by the black ink is a relatively low value D_K1, the same as in the first embodiment. The relative lightness of the image recorded in the region A3 by the black ink is a relatively high value D_K2. The relative lightness in the region A2 gradationally increases from D_K1 to D_K2, from the left side in the X direction to the right side accordingly. The reason is that by using the distribution patterns illustrated in FIGS. 16A and 16B, the distribution ratio to the discharge orifice row 111K within the recording head 102L gradationally decreases from the left side in the X direction to the right side accordingly, while the distribution ratio to the discharge orifice row 112K within the recording head 102R gradationally increases, as described above.

For example, the distribution ratio to the discharge orifice row 112K near the region A1 in the region A2 in the X direction is small, and the distribution ratio to the discharge orifice row 111K is great. Accordingly, more ink is discharged from the discharge orifice row 111K to the image recorded by black ink in this region, so the effects of discharge characteristics of the discharge orifice row 111K are dominant. Accordingly, the relative lightness near region A1 in the region A2 in the X direction is a value close to that of D_K1.

It can be seen from FIG. 17 that the width of the region A2 in the X direction where shared recording is performed by black ink can be made longer than the width of the region A5 in the X direction where shared recorded is performed by yellow ink in the present embodiment, the same as in the first embodiment. Further, the relative lightness of the black ink in the region A2 can be gradationally changed from D_K1 to D_K2 from the left side in the X direction to the right side in the present embodiment, as described above. This enables sudden local change in lightness to be suppressed, even at the boundary between region A1 and region A2, and region A2 and region A3.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like. Although a case of using cyan ink, magenta ink, yellow ink, and black ink has been described in the above embodiments, this is not restricted to using inks of different colors. Advantages of the embodiments can be yielded in a case of using multiple types of ink that differ from each other in lightness. For example, in a case where the composition of a first black ink and a second black ink differ, and the lightness of the second black ink is higher than the first black ink, the distance between discharge orifice rows that discharge the first black ink can be made shorter than the distance between discharge orifice rows that discharge the second black ink.

Description has been made in the embodiments above regarding a case of using cyan ink, magenta ink, yellow ink, and black ink, including dye as a color material. However, ink containing pigment may be used as well.

Although description has been made in the above embodiments regarding a recording unit where the left recording head and right recording head are disposed separated by a certain distance, it is preferable that this separation distance (W5) is longer than the distance d between discharge orifice rows in the recording heads. Since the longer the distance between recording heads is, the more the recording time can be reduced, so the recording heads are preferably separated in practice by a distance that yields a desired recording time.

Although an arrangement has been described in the above embodiments where one discharge orifice row is configured by a single row of multiple discharge orifices that discharge ink of the same color being arrayed in the Y direction, other arrangements may be made as well. For example, an arrangement may be made where one discharge orifice row is configured by two rows of multiple discharge orifices that discharge ink of the same color being arrayed in the Y direction, with the two rows being positionally staggered in the X direction such that the discharge orifices of one row can discharge ink between discharge orifices of the other row. In this case, the above-described distance between the discharge orifice rows can be based on the center position in the X direction between the two rows making up each discharge orifice row.

Although description has been made in the above embodiments regarding a recording unit made up of two different recording heads and a holding part holding the recording head, other arrangements may be made. That is to say, advantages the same as those of the embodiments can be yielded by an arrangement using a recording unit having a first recording part and a second recording part each having discharge orifice rows discharging two types of ink having different lightness, with the first and second recording parts being disposed with a certain distance therebetween in the X direction. For example, advantages the same as those of the embodiments can be yielded by an arrangement using a recording unit that does not have a holding part and the first recording unit and second recording unit are provided within a single recording head.

According to the recording device of the disclosure, change in lightness can be made inconspicuous even in cases where there is change in the amount of discharge differs among recording parts due to difference in discharge characteristics, without making the scanning range of the recording unit longer.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-120098 filed Jun. 16, 2016, which is hereby incorporated by reference herein in its entirety.

What is claimed is:
1. A recording device comprising:
a recording unit including
  a first recording part where there are provided at least
    a first discharge orifice row where a plurality of discharge orifices that discharge a first ink are arrayed in a predetermined direction, and
    a second discharge orifice row where a plurality of discharge orifices that discharge a second ink of a different color from the first ink are arrayed in the predetermined direction, and
  a second recording part where there are provided at least
    a third discharge orifice row where a plurality of discharge orifices that discharge the first ink are arrayed in the predetermined direction, and
    a fourth discharge orifice row where a plurality of discharge orifices that discharge the second ink are arrayed in the predetermined direction,
  the first recording part and the second recording part being separated from each other in an intersecting direction that intersects the predetermined direction;
a scanning unit configured to perform recording scanning by moving the recording unit; and
a recording control unit configured to, in a same recording scan by the scanning unit, perform recording of a region on the recording medium in the intersecting direction, including one edge of the recording medium, by only the first recording part, perform recording of a region on the recording medium in the intersecting direction, including the other edge of the recording medium, by only the second recording part, and perform recording of a region on the recording medium between the region recorded only by the first recording part and the region recorded only by the second recording part in the intersecting direction, by both the first recording part and the second recording part, wherein the second ink has a higher lightness than the first ink, and wherein a distance between the first discharge orifice row and the third discharge orifice row in the intersecting direction is a first distance, and a distance between the second discharge orifice row and the fourth discharge orifice row in the intersecting direction is a second distance that is longer than the first distance.

2. The recording device according to claim 1, wherein the first discharge orifice row and the third discharge orifice row are each situated between the second discharge orifice row and the fourth discharge orifice row in the intersecting direction.

3. The recording device according to claim 1, wherein the first recording part further includes a fifth discharge orifice row where a plurality of discharge orifices that discharge a third ink, that is of a different color from the first and second inks, and that has a higher lightness than the second ink, are arrayed in the predetermined direction, wherein the second recording part further includes a sixth discharge orifice row where a plurality of discharge orifices that discharge the third ink are arrayed in the predetermined direction, and wherein a distance between the fifth discharge orifice row and the sixth discharge orifice row in the intersecting direction is a third distance that is longer than the second distance.

4. The recording device according to claim 3, wherein the second discharge orifice row and the fourth discharge orifice row are each situated between the fifth discharge orifice row and the sixth discharge orifice row in the intersecting direction.

5. The recording device according to claim 1, wherein the recording control unit performs, in a same recording scan by the scanning unit, recording of a first region on the recording medium in the intersecting direction, including one edge of the recording medium, by the first discharge orifice row without using the third discharge orifice row, recording of a second region on the recording medium in the intersecting direction, including the other edge of the recording medium, by the third discharge orifice row without using the first discharge orifice row, and recording of a third region between the first region and the second region in the intersecting direction, by both the first discharge orifice row and the third discharge orifice row, wherein the recording control unit performs, in a same recording scan by the scanning unit, recording of a fourth region in the intersecting direction, including one edge of the recording medium, by the second discharge orifice row without using the fourth discharge orifice row, recording of a fifth region on the recording medium in the intersecting direction, including the other edge of the recording medium, by the fourth discharge orifice row without using the second discharge orifice row, and recording of a sixth region between the fourth region and the fifth region in the intersecting direction, by both the second discharge orifice row and the fourth discharge orifice row, wherein the distance of the sixth region is shorter in the intersecting distance than the third region.

6. The recording device according to claim 5, further comprising:

an acquisition unit configured to
acquire first image data corresponding to images recorded in the first, second, and third regions, by the first ink, and
acquire second image data corresponding to images recorded in the fourth, fifth, and sixth regions, by the second ink;

a distribution unit configured to
generate the first image data corresponding to the first discharge orifice row and the first image data corresponding to the third discharge orifice row, by distributing the first image data corresponding to an image recorded in the third region, to the first discharge orifice row and the third discharge orifice row, and
generate the second image data corresponding to the second discharge orifice row and the second image data corresponding to the fourth discharge orifice row, by distributing the second image data corresponding to an image recorded in the sixth region, to the second discharge orifice row and the fourth discharge orifice row;

a first generating unit configured to
generate first recording data used for recording from the first discharge orifice row, based on the first image data corresponding to an image recorded in the first region acquired by the acquisition unit, and the first image data corresponding to the first discharge orifice row generated by the distribution unit, and
generate second recording data used for recording from the third discharge orifice row, based on the first image data corresponding to an image recorded in the second region acquired by the acquisition unit, and the first image data corresponding to the third discharge orifice row generated by the distribution unit; and a second generating unit configured to
generate third recording data used for recording from the second discharge orifice row, based on the second image data corresponding to an image recorded in the fourth region acquired by the acquisition unit, and the second image data corresponding to the second discharge orifice row generated by the distribution unit, and
generate fourth recording data used for recording from the fourth discharge orifice row, based on the second image data corresponding to an image recorded in the fifth region acquired by the acquisition unit, and the second image data corresponding to the fourth discharge orifice row generated by the distribution unit.

7. The recording device according to claim 6,
wherein the distribution unit distributes the first image data to the first discharge orifice row and the third discharge orifice row to where
the first image data corresponding to an image recorded at a first position in the intersecting direction within the third region by the first discharge orifice row is larger than the first image data corresponding to an image recorded at the first position by the third discharge orifice row, and
the first image data corresponding to an image recorded at a second position that is closer to the second region that the first position in the intersecting direction within the third region by the first discharge orifice row is smaller than the first image data corresponding to an image recorded at the second position by the third discharge orifice row.

8. The recording device according to claim 6,
wherein the distribution unit distributes second image data to the second discharge orifice row and the fourth discharge orifice row to where
the second image data corresponding to an image recorded at a third position in the intersecting direction within the sixth region by the second discharge orifice row is larger than the second image data corresponding to an image recorded at the third position by the fourth discharge orifice row, and
the second image data corresponding to an image recorded at a fourth position that is closer to the fifth region that the third position in the intersecting direction within the sixth region by the second discharge orifice row is smaller than the second image data corresponding to an image recorded at the fourth position by the fourth discharge orifice row.

9. The recording device according to claim 1,
wherein the first ink is color ink, and the second ink is black ink.

10. The recording device according to claim 9,
wherein the surface of the recording medium is white.

11. The recording device according to claim 1,
wherein the first recording part and the second recording part are different recording heads,
and wherein the recording unit includes a holding part configured to hold the first recording part and the second recording part.

12. The recording device according to claim 1,
wherein the first recording part and the second recording part of the recording unit are disposed at the same position as each other in the predetermined direction.

13. The recording device according to claim 1,
wherein the recording medium has a higher lightness than the first ink and the second ink.

14. A recording method of performing recording using a recording unit including
a first recording part where there are provided at least
a first discharge orifice row where a plurality of discharge orifices that discharge a first ink are arrayed in a predetermined direction, and
a second discharge orifice row where a plurality of discharge orifices that discharge a second ink of a different color from the first ink are arrayed in the predetermined direction, and
a second recording part where there are provided at least
a third discharge orifice row where a plurality of discharge orifices that discharge the first ink are arrayed in the predetermined direction, and
a fourth discharge orifice row where a plurality of discharge orifices that discharge the second ink are arrayed in the predetermined direction,
the first recording part and the second recording part being separated from each other in an intersecting direction that intersects the predetermined direction,
the method comprising:
performing recording scanning by moving the recording unit; and
controlling recording operations to, in a same recording scan by the scanning unit,
perform recording of a region on the recording medium in the intersecting direction, including one edge of the recording medium, by only the first recording part,
perform recording of a region on the recording medium in the intersecting direction, including the other edge of the recording medium, by only the second recording part, and
perform recording of a region on the recording medium between the region recorded only by the first recording part and the region recorded only by the second recording part in the intersecting direction, by both the first recording part and the second recording part,
wherein the second ink has a higher lightness than the first ink,
and wherein a distance between the first discharge orifice row and the third discharge orifice row in the intersecting direction is a first distance, and a distance between the second discharge orifice row and the fourth discharge orifice row in the intersecting direction is a second distance that is longer than the first distance.

15. A recording unit comprising:
a first recording part where there are provided at least
a first discharge orifice row where a plurality of discharge orifices that discharge a first ink are arrayed in a predetermined direction, and
a second discharge orifice row where a plurality of discharge orifices that discharge a second ink of a different color from the first ink are arrayed in the predetermined direction; and
a second recording part where there are provided at least
a third discharge orifice row where a plurality of discharge orifices that discharge the first ink are arrayed in the predetermined direction, and
a fourth discharge orifice row where a plurality of discharge orifices that discharge the second ink are arrayed in the predetermined direction,
wherein the first recording part and the second recording part being separated from each other in an intersecting direction that intersects the predetermined direction,
wherein the second ink has a higher lightness than the first ink,
and wherein a distance between the first discharge orifice row and the third discharge orifice row in the intersecting direction is a first distance, and a distance between the second discharge orifice row and the fourth discharge orifice row in the intersecting direction is a second distance that is longer than the first distance.

16. The recording unit according to claim 15,
wherein the first recording part and the second recording part are different recording heads,
and wherein the recording unit includes a holding part configured to hold the first recording part and the second recording part.

* * * * *